Nov. 4, 1952 H. P. LUHN 2,616,561

SORTING MACHINE

Filed April 18, 1950 15 Sheets-Sheet 1

INVENTOR
HANS P. LUHN
BY
Charles E. McTiernan
ATTORNEY

INVENTOR
HANS P. LUHN
BY
Charles E. McTiernan
ATTORNEY

Nov. 4, 1952 H. P. LUHN 2,616,561

SORTING MACHINE

Filed April 18, 1950 15 Sheets-Sheet 3

INVENTOR
HANS P. LUHN

BY
Charles E. McTiernan
ATTORNEY

INVENTOR
HANS P. LUHN
BY
Charles E. McTiernan
ATTORNEY

INVENTOR
HANS P. LUHN
BY
Charles E. McTiernan
ATTORNEY

INVENTOR
HANS P LUHN
BY
Charles E. McTiernan
ATTORNEY

INVENTOR
HANS P. LUHN
BY
Charles E. McTiernan
ATTORNEY

Nov. 4, 1952 H. P. LUHN 2,616,561

SORTING MACHINE

Filed April 18, 1950 15 Sheets-Sheet 8

INVENTOR
HANS P. LUHN

BY
Charles E. McTiernan
ATTORNEY

INVENTOR
HANS P. LUHN
BY
Charles E. McTiernan
ATTORNEY

INVENTOR
HANS P. LUHN
BY
Charles E. McTiernan
ATTORNEY

INVENTOR
HANS P. LUHN
BY
Charles E. McTiernan
ATTORNEY

Nov. 4, 1952

H. P. LUHN 2,616,561

SORTING MACHINE

Filed April 18, 1950

15 Sheets-Sheet 12

INVENTOR
*HANS P. LUHN*
BY
Charles E. McTiernan
ATTORNEY

| | Index Series | | | | Major Series | | | | | Minor Series | | | |
|---|---|---|---|---|---|---|---|---|---|---|---|---|---|
| | A1 | A2 | B1 | B2 | C1 | C2 | D1 | D2 | E | F1 | F2 | G1 | G2 |
| DECK U {Y X | | | | | 1 | | | | | 2 | | | |
| DECK I {0 1 2 3 4 | 0-1 | 5-4 | 3 | 2 | 4 | 0 | 1 | 3 | 2 | 0 | 3 | 2 | 1 |
| DECK L {5 6 7 8 9 | 5-4 | 0-1 | 2 | 3 | 0 | 4 | 3 | 1 | 2 | 3 | 0 | 1 | 2 |
| Possible Combinations | 26 | 26 | 100 | 100 | 5 | 5 | 50 | 50 | 100 | 10 | 10 | 50 | 50 |
| | 252 | | | | 210×2=420 | | | | | 120 | | | |

Total Combinations = 792

INVENTOR
HANS P. LUHN
BY
Charles E. McTiernan
ATTORNEY

Nov. 4, 1952 H. P. LUHN 2,616,561

SORTING MACHINE

Filed April 18, 1950 15 Sheets-Sheet 14

INVENTOR
HANS P. LUHN
BY
Charles E. McTiernan
ATTORNEY

Nov. 4, 1952 H. P. LUHN 2,616,561

SORTING MACHINE

Filed April 18, 1950 15 Sheets-Sheet 15

INVENTOR
HANS P. LUHN
BY
Charles E. McTiernan
ATTORNEY

Patented Nov. 4, 1952 2,616,561

UNITED STATES PATENT OFFICE 2,616,561

SORTING MACHINE

Hans P. Luhn, Armonk, N. Y., assignor to International Business Machines Corporation, New York, N. Y., a corporation of New York Application April 18, 1950, Serial No. 156,691

2 Claims. (Cl. 209—110)

This invention relates generally to improvements in record controlled machines and more specifically to a sorting machine for record cards.

The invention further relates to the sorting of record or detail cards having character or symbol designations punched therein pursuant to a new and novel fixed five hole coding system. This novel coding system consists of five perforations being punched in a single column of a detail card divided into three decks in various combinations among twelve possible recording positions disposed within the three decks of the record card. The 792 possible five-hole combinations are distributed amongst three main classifications or series, namely, the index, the major and the minor series where each series is subdivided into subseries. In order to prepare the sorter for a sorting operation upon a plurality of cards containing data in codified form, it is necessary that the sorter be initially conditioned for such an operation by the manual setting of a numerical order switch, a code group differentiating switch, and a code selector switch.

The initial step to be taken in conditioning the sorting machine for a sorting operation is to move the code selector switch to the contact position corresponding to the subseries in which the desired sort is to be made. The code selector switch which controls the allied circuits for sorting the various coding subseries has a corresponding position for each of the subseries and in case of those subseries having more than ten characters or symbols there is one contact position for each ten characters.

In the coding arrangement employed the units and tens digits of a two digit number are represented within a single column of the card thereby necessitating two sorts upon a single column during a numerical sorting operation. The numerical order switch enables such an operation to be performed inasmuch as by being set in the lower order position for the first sort and the higher order position for the second sort it is able to differentiate between the two digits thereby causing the detail card to be sorted into the related designation pocket for each sorting operation.

The subseries of the unique coding system are further divided into two groups where the coding arrangement of one group is the mirrored image of the other group. In order to differentiate between the two groups of a subseries it is necessary that the code group differentiating switch be positioned such that a sorting circuit may be completed for the group desired. The code group switch in conjunction with a pair of pulse distributors connected in parallel enables the data detected in a column punched pursuant to either one of the two code groups to be stored in the same group of storage tubes.

The setting of the various switches conditions the sorting machine such that when a coding arrangement of the selected subseries is detected in a detail card during a first card cycle, the data detected is initially stored in a plurality of gas tubes and is then subsequently transferred within the same card cycle to associated relays for priming the decoding circuits for operation within the following card cycle. In the following card cycle, the decoding circuits translate the codified data to the representative designation thereby causing the card pockets to receive cards with related designations.

The principal object of the invention is to provide a machine which is capable of sorting data bearing record cards where the data are represented therein by means of either a single-hole or a combinational-hole coding arrangement.

Another object of the invention is to provide a machine having decoding means for properly sorting data bearing record cards into a designated card pocket where the data are represented in a card by a new and novel coding arrangement.

A further object of the invention is to provide a machine capable of selectively sorting record cards bearing codified data represented therein according to one of the three coding series.

A still further object of the invention is to provide a sorting machine having means for decoding a coding combination within a particular column of a detail card such that said card is deposited in the card pocket bearing a related character or symbol designation as represented by said coding combination.

A still further object of the invention is to provide a sorting machine which is adapted to sort record cards bearing selected designations in codified form of a particular coding series into related card pockets, and to preliminarily sort the remaining designations of said series in preparation for a subsequent sorting operation on said remaining designations.

Other objects of the invention will be pointed out in the following description and claims and illustrated in the accompanying drawings, which disclose, by way of example, the principle of the invention and the best mode, which has been contemplated, of applying that principle.

Figures 1, 2:
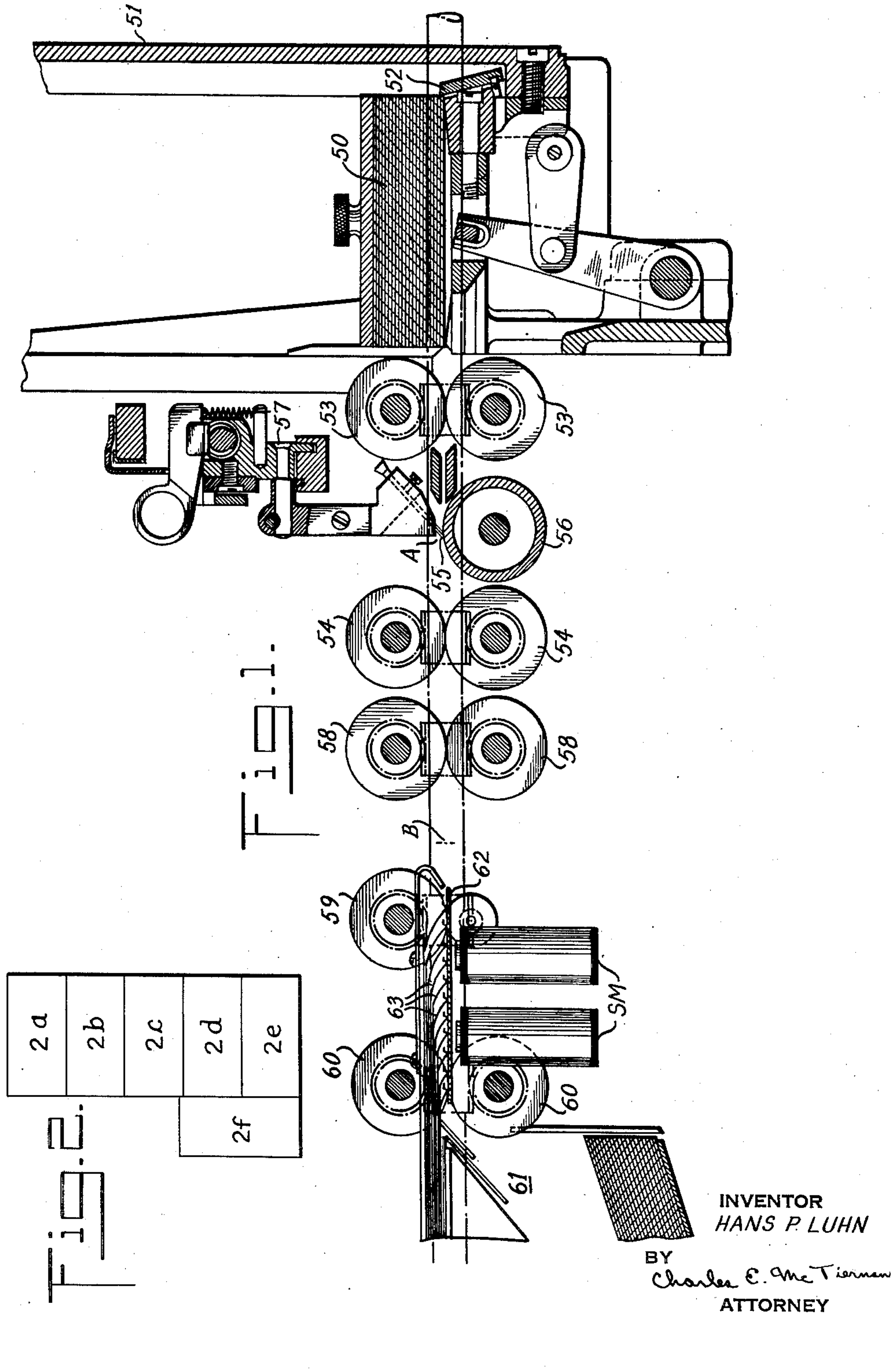
Fig. 1 is a partial vertical section of the well known sorting machine.
Fig. 2 is a diagram showing the order in which the figures constituting the wiring diagram are to be arranged.

Figs. 2*a*, 2*b*, 2*c*, 2*d*, 2*e* and 2*f* which taken together and arranged in the order designated in Fig. 2 constitute a wiring diagram of the electric circuits of the sorting machine.

Figs. 3 to 15 represent the several series and subseries grouping of a new and novel coding arrangement.

Figures 16, 18:
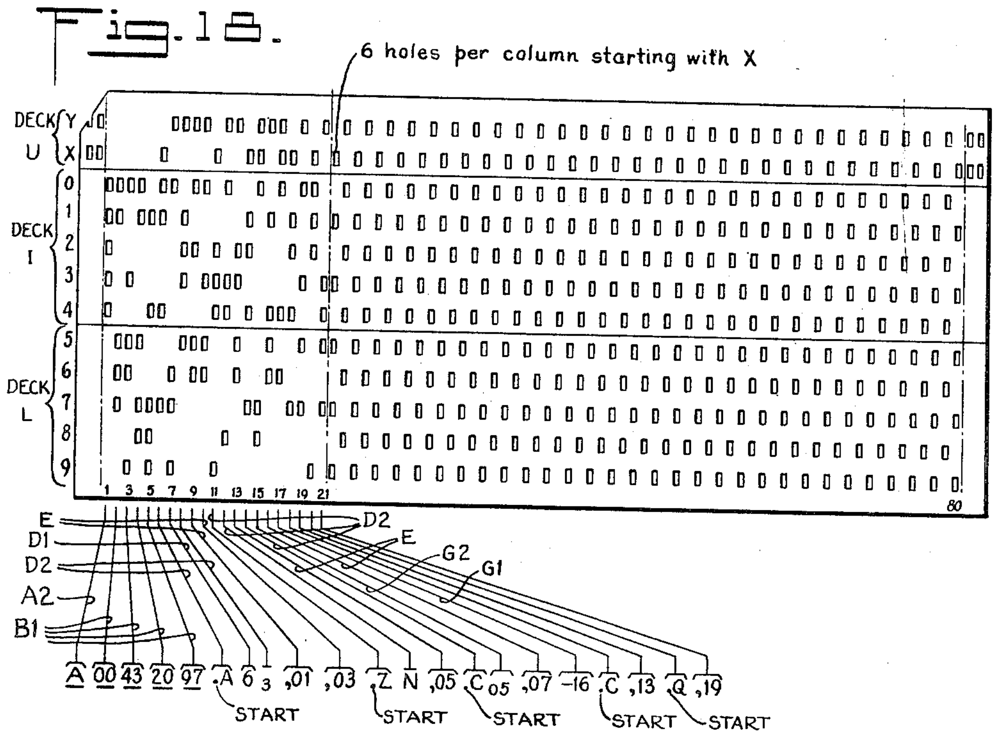

Fig. 16 is a chart summarizing the several groupings.

Figure 17A:
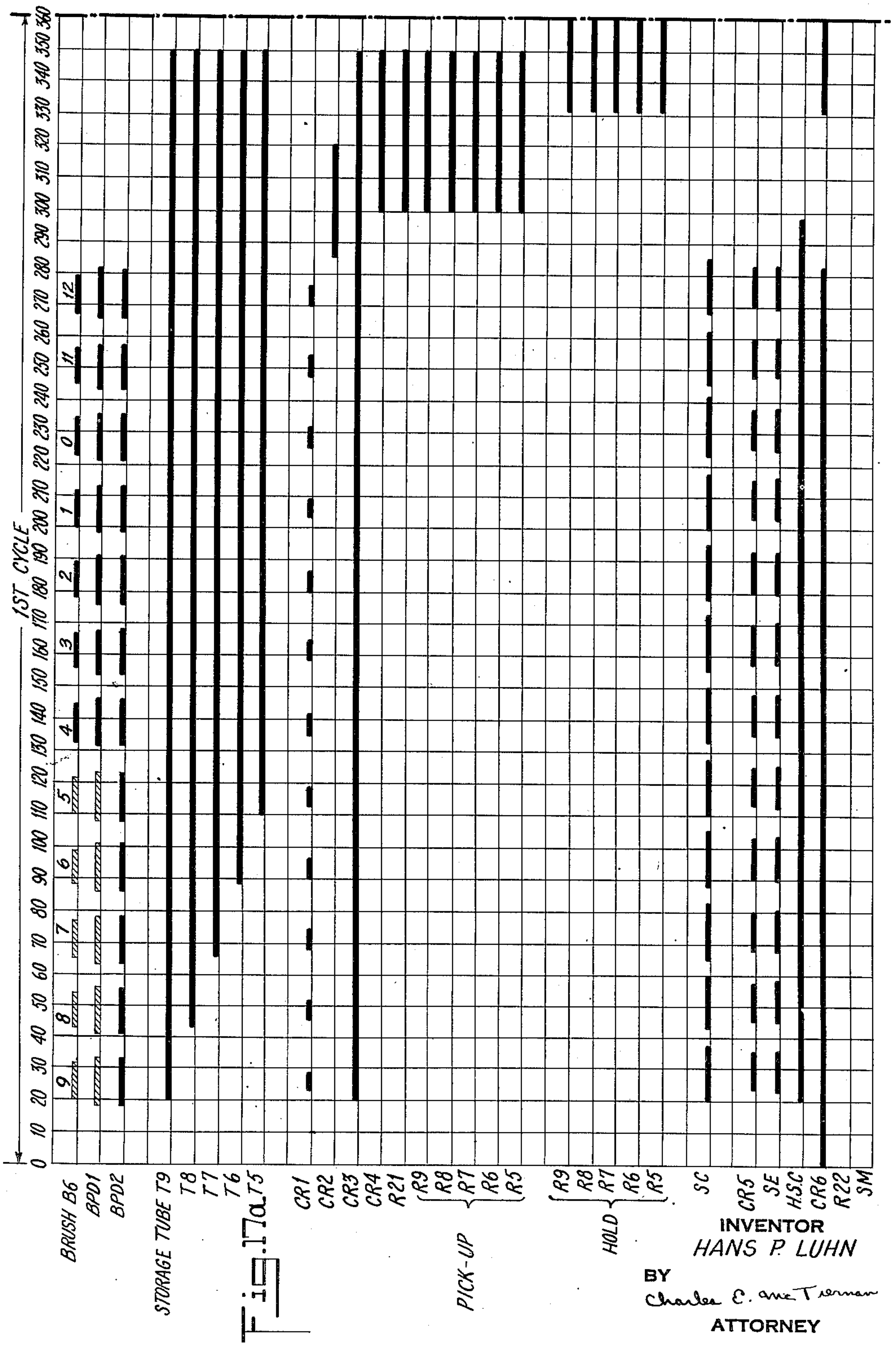
Figure 17B:
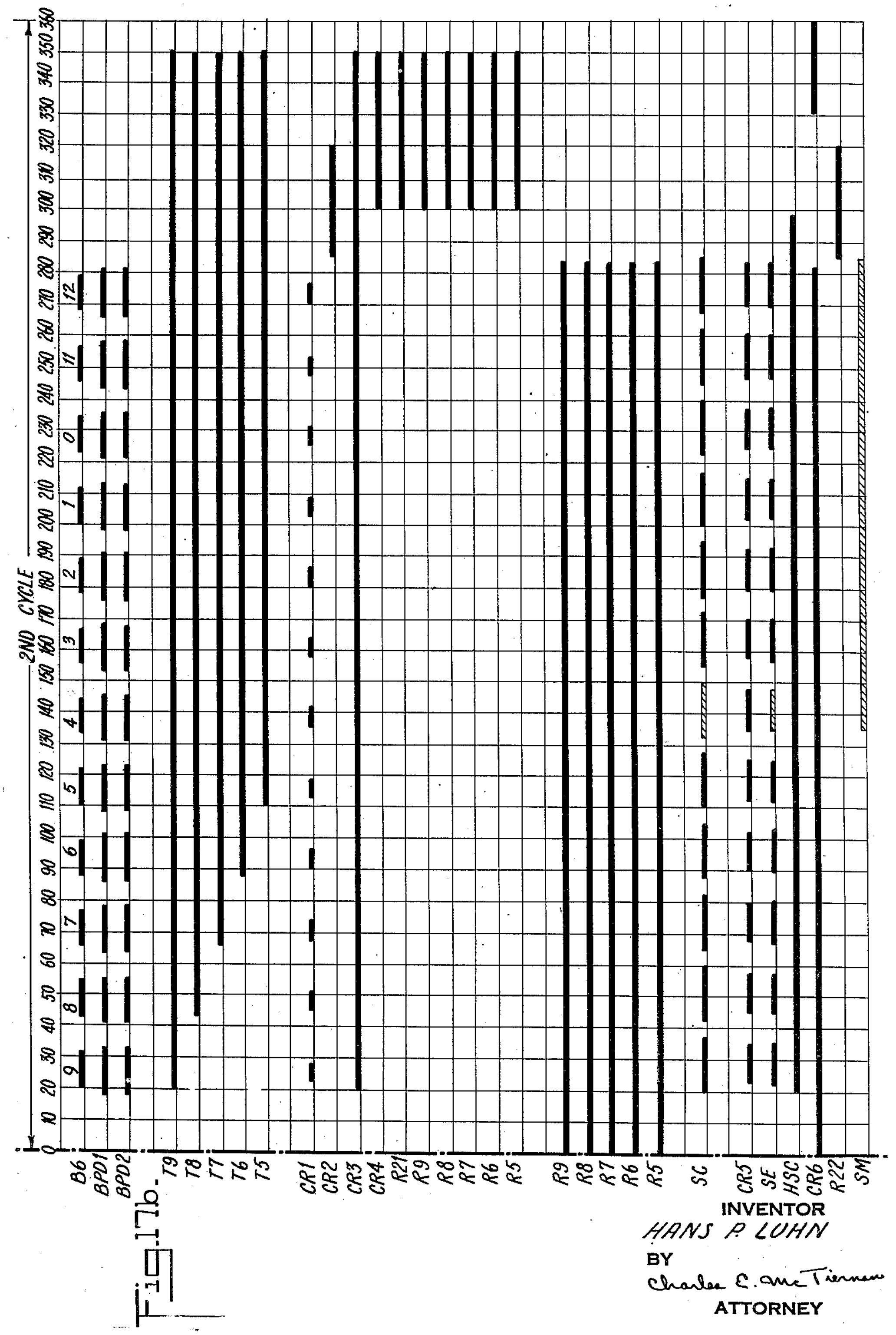

Figs. 17*a* and 17*b* are timing diagrams showing the operation of the sorting machine.

Fig. 18 is a detail card showing perforations in accordance with the new coding arrangement.

THE RECORD CARD

In order that the invention described herein may be fully appreciated and understood, a description of the novel coding arrangement employed therewith will first be described.

The record card is shown and described in copending application Serial No. 153,197, filed March 31, 1950, wherein the novel features thereof are claimed.

The record card in which statistical or other reference data are to be recorded, in accordance with the present invention, takes the form of the well known IBM machine controlling record card, which is provided as shown in Fig. 18 with the usual 80 vertical columns of punching or recording positions, each of which columns contains twelve so-called index point positions designated Y, X, 0, 1, 2, 3, 4, 5, 6, 7, 8, 9. For purposes of the present invention, the card is subdivided into three so-called decks, of which the upper deck U includes the Y and X positions, the intermediate deck I includes the 0 to 4 positions, and the lower deck L includes the remaining positions 5 to 9.

Data are recorded in the card columns by utilization of a code in which combinations of five holes distributed among the twelve possible recording positions in each column are grouped, to provide an arrangement that is more suitable for interpretation, and will enable the recording of more data in a given length of record card, i. e., a given number of card columns, than has heretofore been accomplished. This is effected by distributing the 792 possible five hole combinations in what may be designated as index, major and minor series, which are broadly distinguishable in that the index series contains no perforations in deck U; the major sets contains a perforation in either the X or Y position in deck U; and the minor series has perforations in both the X and Y positions of deck U.

INDEX SERIES

The several five hole combinations included in the index series are represented in Figs. 3, 4, 5 and 6 from which, it will be noted, that this series is subdivided into what may be termed subseries A1, A2, B1 and B2.

Figure 3:
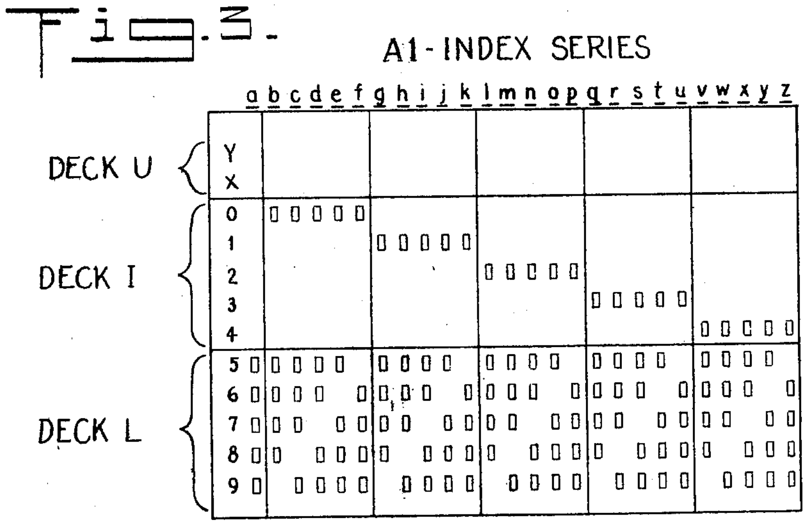

*Index series A1.*—Referring particularly to Fig. 3 this subseries comprises five-hole combinations wherein four holes are grouped in deck L and the fifth hole lies in deck I, and also the special case where all five holes or designations lie in deck L. These different combinations of which there are twenty-six may have assigned to them designations such as indicated along the top edge of the record to identify them as, for example, lower case letters as further distinguished by an underscoring mark.

It will be noted that in this subseries the hole arrangement in the lower deck L with the exception of the arrangement of all five holes being in the L deck repeats for each successive group of five letters, and that the location of the hole in deck I will identify to which section of the alphabet the lower group relates.

It is to be noted that in Fig. 3 and other coding diagrams that the recording columns are spaced apart a greater distance than they would occur on the record card. This is done to enable easier identification of the combinations occurring in the various columns.

Figure 4:
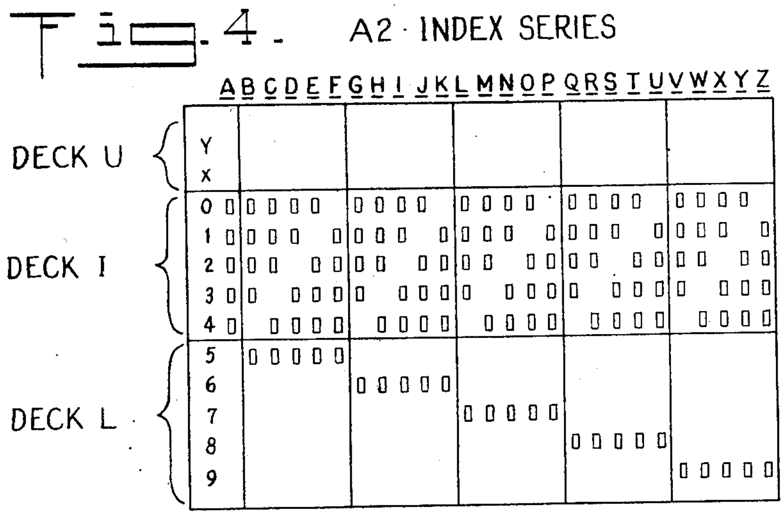
Figure 5:
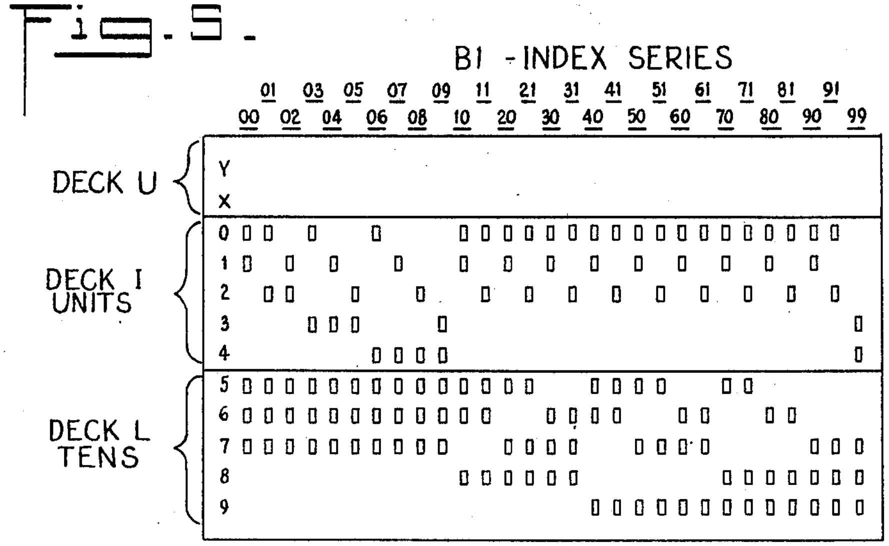

*Index series A2.*—In Fig. 4 are grouped all the five hole combinations wherein five or four of the positions occur in the intermediate deck I and the remaining designation occurs in deck L. This provides a group of 26 different characters to which may be assigned another set of characters as indicated along the upper edge of the record, and may relate to upper case letters of the alphabet accompanied by an underscoring mark.

A comparison of the coding in Figs. 3 and 4 will show the facility with which a designated character may be identified in the present arrangement. Taking any of the combinations illustrated, the absence of perforations in deck U, identifies it as being in the index series, the grouping of either four or five holes in a single one of the decks identifies it as an alphabetic character. The location of these four or five holes in deck I would identify it as an upper case letter, while if the four or five holes occur in deck L it would be identified as a lower case letter.

It is to be particularly noted that the distinction between the subseries A1 and A2 lies in the fact that there is a transposition of decks, i. e. deck L of Fig. 3 is the same as deck I in Fig. 4, and similarly deck I of Fig. 3 is the same as deck L of Fig. 4.

Figure 5:
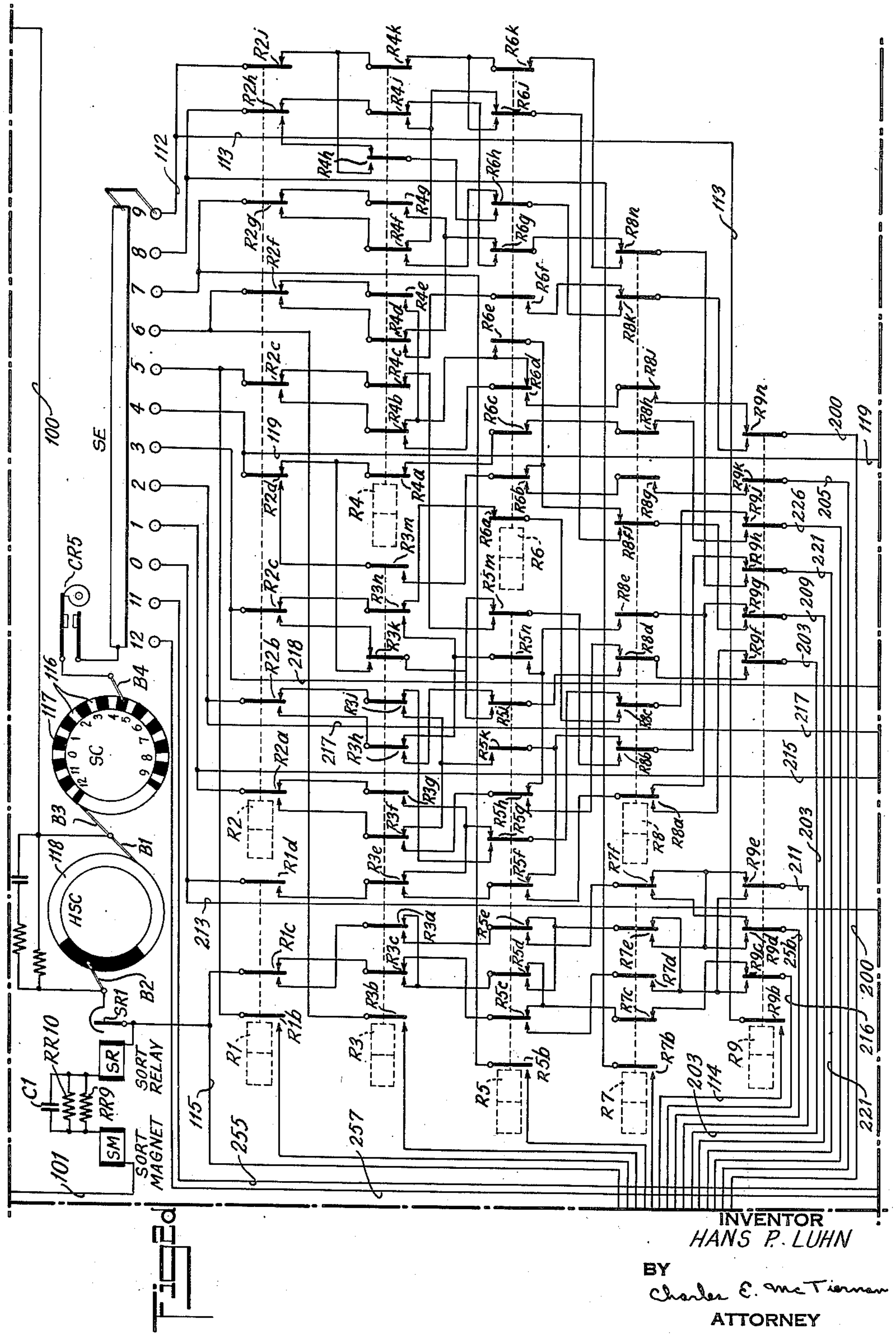
Figure 2E:
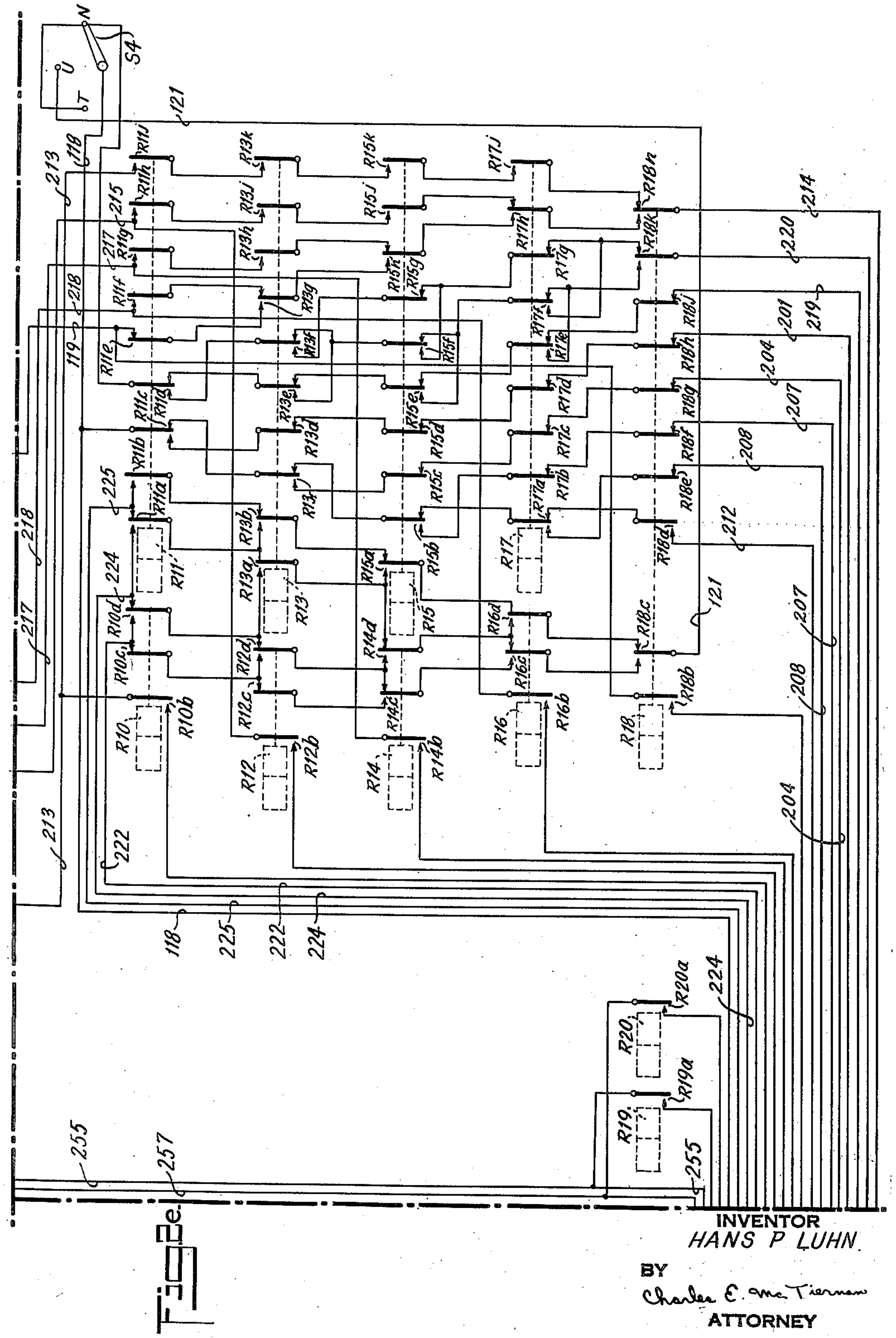
Figure 2F:
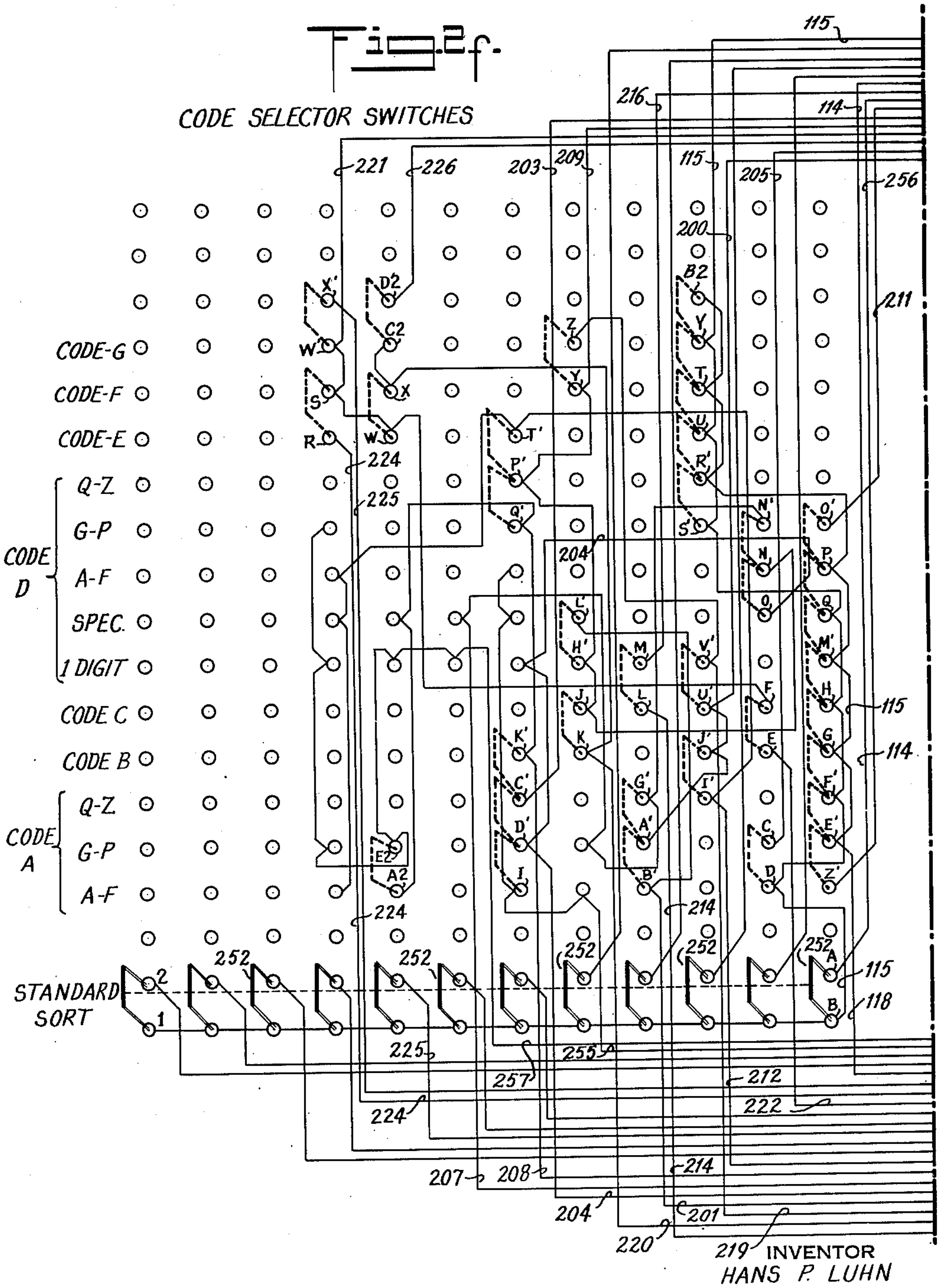

*Index series B1.*—In Fig. 5 it is shown how all the combinations, wherein three holes lie in deck L and two holes lie in deck I, are utilized to represent a hundred different things which for convenience are identified along the top edge of the record as 2-place numerals accompanied by an underscoring mark. In addition thereto, the two numerals are represented in a single column as a 2-place number with the tens digit identified by the three hole combination in deck L and the units digit by the 2 hole combination deck I. This arrangement might be termed a combination within a combination in that the units digits within deck I are represented in the form of a two hole combination, that is, by perforations in various pairs of the possible five positions in this deck, while in deck L the tens digits are represented by perforations in three of the possible five hole locations.

*Index series B2.*—This series (Fig. 6) provides a further arrangement utilizing all the five hole combinations numbering 100, in which three of the five designations occur in deck I while the remaining two occur in deck L. Each combinational arrangement is identifiable as a 2-place number followed by the number sign #, the three hole combinations in deck I identify the tens digit of the 2-place numbers, while the two hole combinations in deck L identify the units digit.

Figure 6:
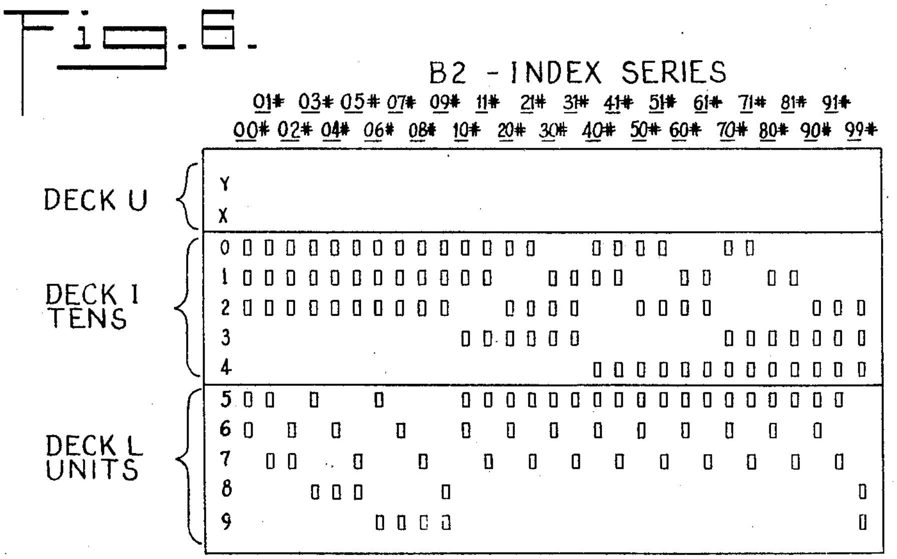
Figure 7:
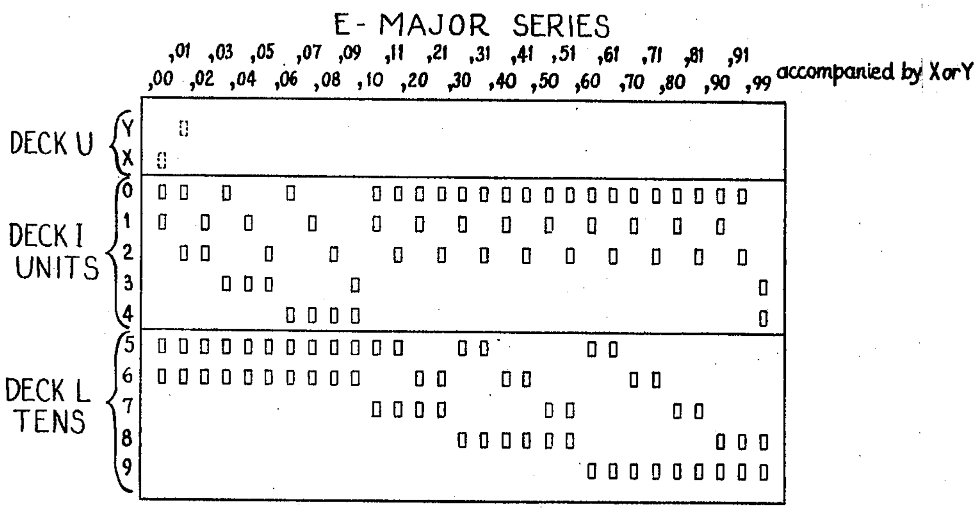

Comparison between Figs. 5 and 6 shows the identity of deck L in Fig. 6 with deck I in Fig. 5 and also the identity between deck I in Fig. 6 and deck L in Fig. 5.

Considering the four subseries of this index series, its distinctive characteristics may be summarized as follows:

(1) Absence of perforations in deck U identify it as the index series.

(2) A group of four or five holes in either of the two lower fields identify it as an alphabetic series A1 or A2.

(3) The location of the four hole group identify it as a lower case series A1 if occurring in deck L and as an upper case series A2 if occurring in deck I.

(4) The grouping of the perforations with three in either of the two lower decks will identify the subseries as B1 or B2 and the three hole grouping will identify the tens digit of the 2-place number in both cases.

(5) If the tens digit is in the lower deck L, it identifies the series B1 and if the tens digit occurs in deck I it identifies the series as B2.

It is to be particularly noted that the B1 and B2 series provide for recording two digits in a single column with each digit in a predetermined deck and with the units and tens digits distinguishable by their separate subcombinational characteristics within their related decks.

Referring to Fig. 18 in which a record is shown with perforations in accordance with the coding described, inspection will show that columns 1 to 5 contain perforations made in accordance with the index series to represent A 00 43 20 97. Inspection will show that the letter A is identifiable as belong to the A2 series and all the digits are related to the B1 series in accordance with the rules of identification set forth hereinabove.

MAJOR SERIES

Figs. 7, 8, 9, 10 and 11 illustrate the groupings of those five hole combinations that include a single hole in either the X or Y positions of deck U. The presence of an X hole identifies the character as one constituting the beginning of a word, term or expression, that is the beginning of a series of characters that are to be taken together to represent some value or quantity. The presence of a Y hole indicates that the combination represents the character within the word, term or expression. This may be made more clear after the coding arrangement for this series has been explained in detail.

*Major series E.*—This series (Fig. 7) comprises those five hole combinations in which one hole occurs in the deck U and two each in decks I and L. There are 100 such combinations including the X hole and another hundred including the Y hole, and in each set the designations are represented as 2-place numbers prefixed by a comma. The only difference is that, where the X index position is perforated, the combination represents the 2-place number and also represents that it is the first character of a word, term or expression. In the combination where the Y hole occurs, it represents a 2-place number and also that it is a part of the word, term or expression other than the first character or symbol thereof. In this series also the two digits of the number represented in any column comprise the units digit in deck I and the tens digit in deck L. The units digit is represented by a two hole combination within the five positions of deck I and the tens digit is represented by the identical two hole combination within the five holes of deck L, so that the tens digit is identified by its location in the lower deck and therein differs from the identification of the tens digit in the index series B1 and B2, where the tens digit is identified by virtue of its representation as a three hole combination in one of the lower decks.

*Major series C1.*—In this series (Fig. 8) are included all the five hole combinations of which one hole occurs in deck U and the remaining four in deck I. Such combinations are identified as underscored numerals for superscript purposes.

*Major series C2.*—In this series (Fig. 9) are included all the five hole combinations, of which one hole occurs in deck U and the remaining four in deck L. Such combinations are identified as underscored numerals 5 to 9 for superscript purposes.

Figure 10:
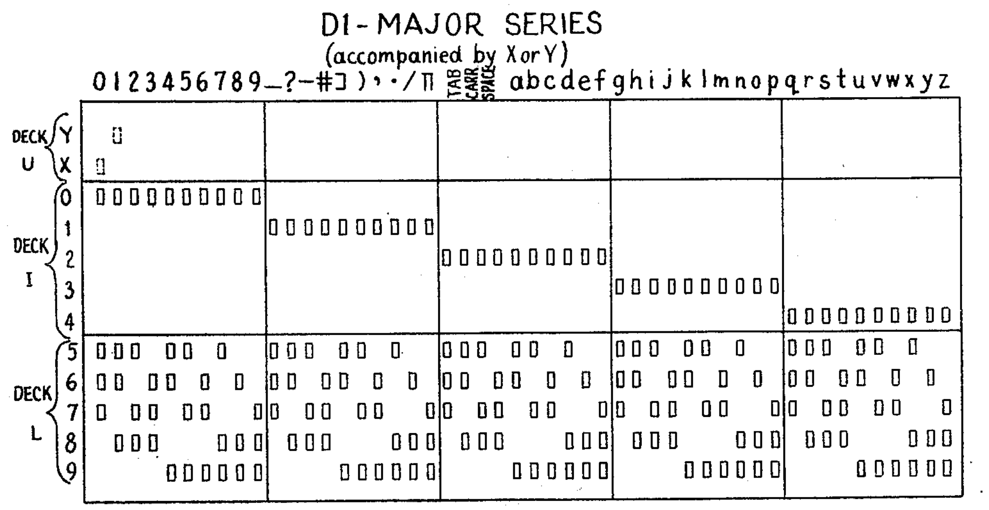

*Major series D1.*—In this series are grouped all the five hole combinations, wherein one hole occurs in each of the two upper decks and the remaining three occur in the lowermost deck L, and to each different combination there is assigned a character or symbol as indicated in Fig. 10 which includes numerals, lower case letters and the more common symbols occurring on the keys of well-known typewriters.

Figure 11:
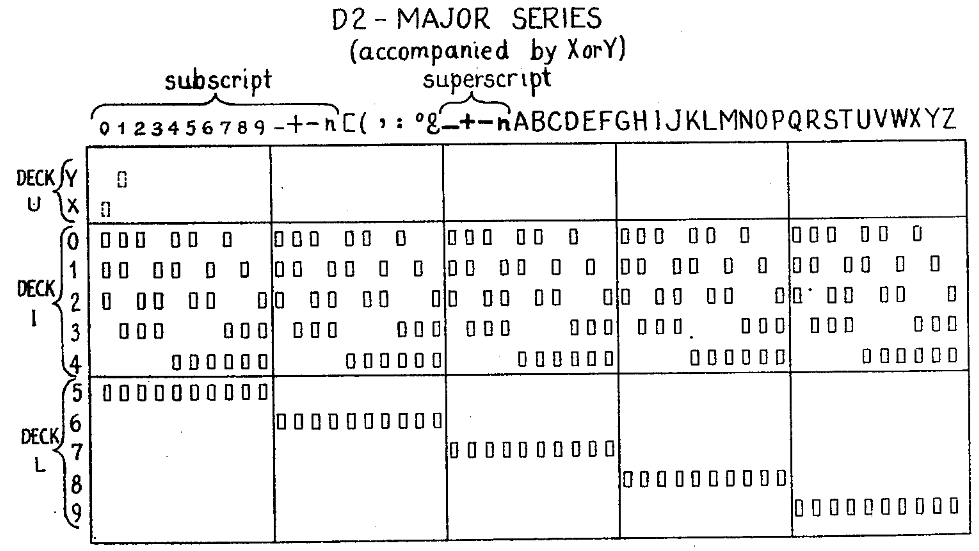

*Major series D2.*—Referring to Fig. 11 in this grouping are all the five hole combinations in which one hole occurs in deck U, one hole in deck L and the remaining three in deck I. This arrangement is the same as that of Fig. 10 with transposition of the decks I and L and with characters allocated to the different combinations as shown along the top margin of the record of Fig. 11.

Briefly reviewing the coding arrangement for this major series, its identity is determined as mentioned hereinabove by the presence of a hole in the X or Y position. The subseries C1 and C2 are readily identifiable by the four hole arrangement within decks I and L, respectively; the E series is identifiable by the split-up of the remaining four holes with two in each of the lower decks, and the D1 and D2 series are identifiable respectively by the presence of three-hole combinations in the lower and intermediate decks, respectively.

Referring to the record card (Fig. 18), the example shown therein indicates in column 6 of the card an X perforation identifying this as a start of a word or expression and constituting part of the five hole combination representing the upper case letter A. The designations in columns 7, 8, 9, and 10 of the card indicate that these characters are part of the expression beginning with the character identified in column 6 of the card, and examination will show that perforations in column 7 represent the numeral 6 of the subseries D1, the perforations in column 8 represent the subscript 3 from the subseries D2, the perforations in column 9 represent the identification ,01 from series E, and the perforations in column 10 represent the characters ,03 also in the E series. In column 11 the combination again occurs with the X hole, indicating that this is the first character of another term or expression, and the combination corresponds to the character Z from series D2.

Column 12 has the Y hole indicating the continuity of the expression, and the 5-hole combination in this column represents the letter N also from the series D2.

MINOR SERIES

Figure 12:
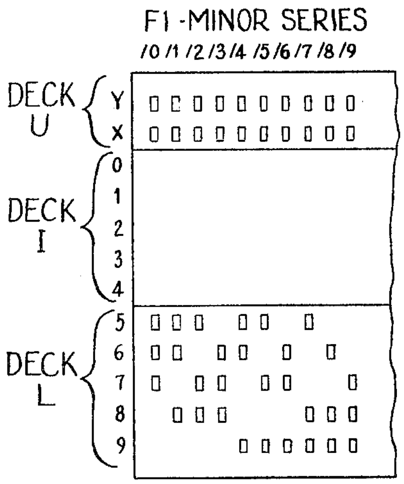
Figure 13:
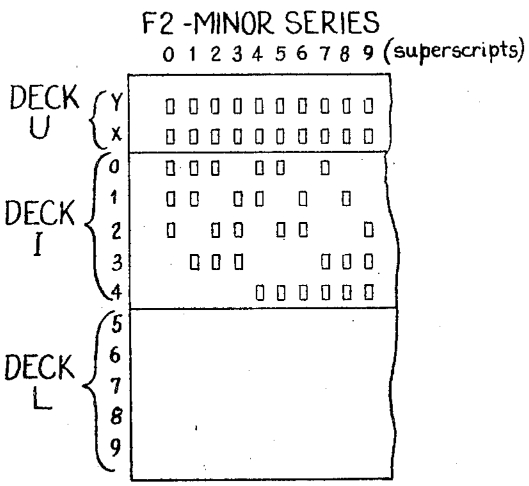
Figure 14:
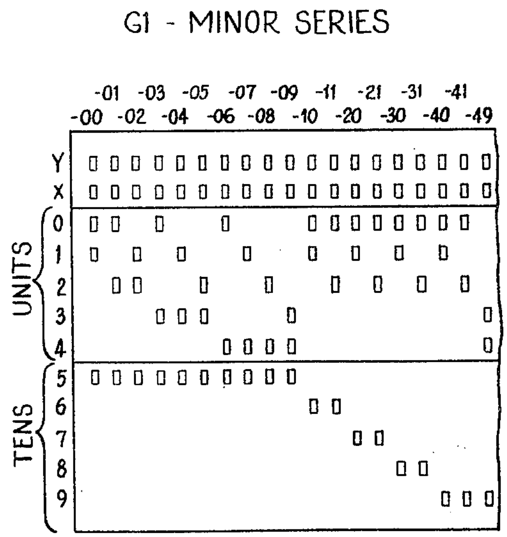
Figure 15:
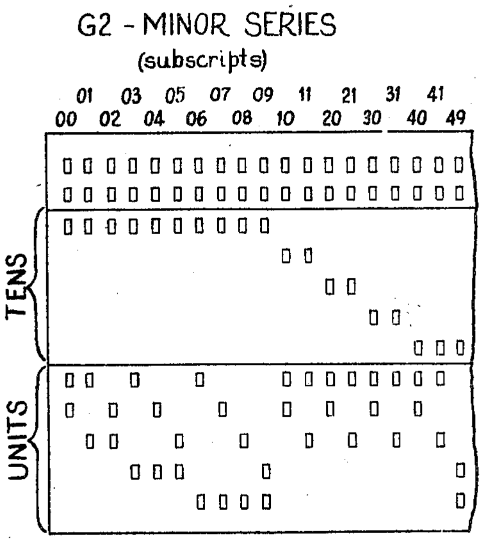

This series is identifiable as such by the presence of a hole or designation in both of the index point positions X and Y of the upper deck U, and this series is broken down into the four subseries designated F1, F2, G1, G2 whose combination arrangements are shown in Figs. 12 and 13.

*Minor series F1.*—This series comprises those five hole combinations where three of the holes will occur in deck L in addition to the two holes in the U deck. There are ten of these and they are identified as the ten digits preceded by a diagonal as indicated in Fig. 12.

*Minor series F2.*—This grouping (Fig. 13) comprises those combinations where the three holes occur in deck I, and these are designated as digits 0 to 9 employed for superscript purposes.

*Minor series G1.*—In this series (Fig. 14) the three holes are arranged with two in deck I and one in deck L to provide 50 different combinations indentifiable by 50 2-place numbers prefixed with a hyphen, of which the units digit is the two hole combination in deck I and the tens digit is the single hole in deck L.

*Minor series G2.*—Finally, the combinations of five holes in which the three holes not included in deck U are distributed with two in deck L and one in deck I to constitute 50 more combinations identified as 50 2-place numbers for subscript purposes. This G2 subseries is the same as G1 with the decks I and L transposed, maintaining the units digits of the 2-place numbers identifiable by the two hole combination and the tens digit by the single hole.

Referring to Fig. 16 distribution of all the 792 five-hole combinations possible in a 2 position record column is briefly summarized to show ready identification of any particular combination. Thus, for example, the combination containing two holes in deck U, one hole in deck I and two in deck L constitutes a combination in the G2 subseries. The combination containing no holes in deck U, two holes in deck I and three in deck L constitutes the combination of the subseries B2 and so on.

Referring again to Fig. 18 it is noted that the perforations in column 14 constitute the first character of an expression as denoted by the presence of an X perforation while in column 15 are perforations identifiable as in the minor series G1, representing the subscript 05. The presence of the Y perforation in this combination also serves to identify this as part of the continuous expression commencing with the X hole in column 14 and continuing through to column 17 where another coding in the minor series identifiable as G1 indicates the value or reference -16. Column 18 represents the start of a new expression. The several columns of perforations are readily identifiable as to code and subcode in accordance with the detailed explanation given hereinabove.

THE SORTER STRUCTURE

In Fig. 1 there is shown a partial vertical section of a well known electric sorting machine, the basic construction and operation of which are substantially the same as the one described in Patent No. 1,741,985. Inasmuch as the general construction and operation of this machine are now well known in the art only a brief general description will be given herein. It will be understood, however, that the invention is not limited in its application to the specific form of sorting machine disclosed in said patent but may be embodied in other sorting machines.

In order to embody the present invention in a machine like the one disclosed in the above patent, two additional sets of feed rollers are required causing a resulting change in the dimensions of the machine framework to accommodate the additional feed rollers as shown in Patent No. 2,434,487. Aside from these changes little alteration in the mechanical structure of the machine of Patent No. 1,741,985 is required.

This lengthening of the frame of the machine by four inches permits a detail card to be analyzed one card cycle before the cycle in which the detail card is sorted into a card pocket as a result of such analysis.

The perforated record cards 50 of the well known IBM type which are provided with rows and columns of index point positions numbered 9, 8, 7, 6, 5, 4, 3, 2, 1, 0, X and Y are placed face down and with the "9" positions to the left in the card feed hopper 51. The cards are successively fed from the hopper 51 by means of the usual card pickers 52 between the feed rollers 53 which grip the card and advance it to the left. The card picker 52 is given one reciprocation per card cycle by well known means driven from the main shaft (not shown). The rollers 53 carry the record past the analyzing station A into a position to be gripped by the feed rollers 54.

The analyzing station A comprises an electrical sensing brush 55 and a contact roll 56. The brush 55 may be removably mounted in the carrier 57 which may be moved by hand to bring the sensing brush into position to sense perforations in preselected columns of the record cards as described in Patent No. 1,741,992.

Prior to the time that the detail card passes from the control of the feed rollers 53, the feed rollers 54 take over the advancement of the card so as to complete the feeding of the card past the analyzing station A and to advance it to the feed rollers 58.

The feed rollers 58 carry each record analyzed by the brush 56 to the left to the position B which corresponds to the analyzing position of the machine described in Patent No. 1,741,985. In the present case the position B will be reached by the leading edge of any sensed detail card at the time when the leading edge of a succeeding record reaches the position A and is about to be traversed by brush 56. In the case of a machine operating according to a 16 point cycle and using standard cards the distance from position A to position B will be exactly four inches since the vertical distance between index point positions of the cards is exactly one fourth of an inch. When any record reaches position B it is about to begin the cycle in which the disposition of such record is to be made in accordance with an analysis made by brush 55 while such record is moving from position A to position B.

After the leading edge of the detail card passes position B, it is engaged by the feed rollers 59 which advance the card to the first of successive pairs of feed rollers 60, only one pair of which is shown in Fig. 1. The feed rollers 60 are instrumental in feeding the card to one of the sorting pockets 61 with only the reject pocket being shown in Fig. 1. The pocket into which the card will be deposited depends upon the energization of the sort magnet SM at a differential time of the card cycle. The armature 62 of the sort magnet SM supports the downwardly biased entrance ends of the chute blades 63 where each pair of blades defines a passage for the card leading to a different sorting pocket. If the card moves below all the blades, it goes to the reject pocket. Upon energization of the magnets SM at a differential time of the cycle, it permits those blades unsupported by the armature to drop and open a path for the card to the proper pocket. For a complete understanding of the operation of the armature 62 and the chute blades 63, reference may be had to the above mentioned Patent No. 1,741,985.

CIRCUIT OPERATION

The sorting machine described and claimed herein is adapted to perform "regular sorting" operations wherein the code used for designating characters is the well known single hole code according to which a single perforation in one of the index positions "9" to "0" of a card column represents the corresponding digital value, in addition to performing a sorting operation upon those cards bearing codified data pursuant to any of the coding arrangements of the index, major and minor series.

In either case, the placing of the sorting machine into operation is the same.

Figure 2A:
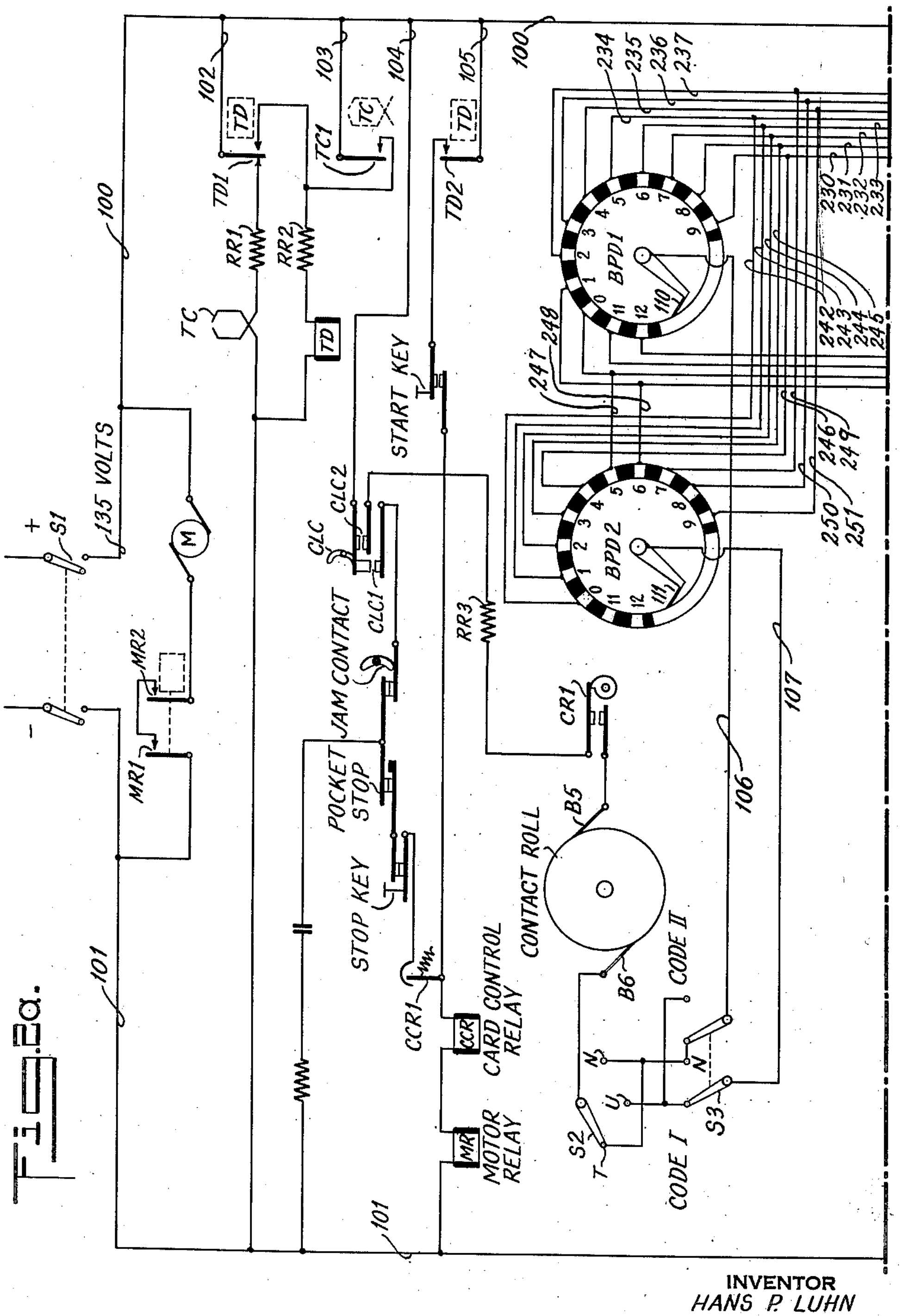

Referring to Fig. 2*a*, upon closing the main switch S1 a source of current is supplied to a thermal coil TC through a complete circuit which may be traced from the line 100 coupled to the positive side of the main source of power, line 102, contact points TD1 of the time delay relay TD, resistor RR1, thermal coil TC to the line 101 coupled to the negative side of the main source of power. As the thermal coil TC is heated, the normally open points TC1 of the thermal coil TC will close, thus causing a circuit to be completed from line 100, line 103, contacts TC1 now closed, resistor RR2, and time delay relay TD to the line 101 whereby the relay TD becomes energized. With the energization of the relay TD, the contact points TD1 shift from the position shown in Fig. 2*a* thereby opening the circuit through the coil TC and retaining the circuit through the relay TD. The use of the thermal coil is employed for the purpose of preventing the starting of the machine until the heating of the filaments of the tubes of the circuit associated with the machine.

The next step is to momentarily depress the start key which will cause a complete circuit to be made from the line 100, line 105, contacts TD2 now closed, start key contacts now closed, card control relay CCR, motor relay MR to the line 101 whereby the relays MR and CCR are energized and the associated contacts MR1 and MR2 and CCR1 are closed causing the motor M to be placed in a running condition.

With the motor M being placed in a running condition, the first detail card fed from the feed hopper 51 closes the card lever contacts CLC1 thus creating a holding circuit for the relays MR and CCR which may be traced from the line 100, line 104, contacts CLC1 now closed, jam contact JC1 normally closed, pocket stop contacts normally closed, stop key contacts normally closed, contacts CCR1 now closed, relays CCR and MR to the line 101. The start key is kept in a depressed position until the card lever contacts CLC1 close to create the holding circuit for the relays MR and CCR. This holding circuit enables the start key to be returned to the original position thereof and the machine will be kept in a running condition until either the card feed hopper is emnty, a card pocket becomes full, a card fails to feed, or the stop key is depressed.

The operation of the sorting machine with respect to detail cards bearing data in codified form pursuant to either the standard single hole code or the new and novel coding arrangement described herein will now be described in detail.

*Regular sorting.*—When a numerical standard sorting operation is to be effected of all those detail cards bearing the digit representation "9," for example, in single-hole form, the machine will be conditioned for such an operation by the numerical order switches S2 (Fig. 2*a*) and S4 (Fig. 2*e*), and the code group differentiating switch S3 (Fig. 2*a*) being set to a normal position while the code selector switch CSS (Fig. 2*f*) is positioned for a standard sorting operation.

The switches S2 and S4 each comprise a tens contact position T, a units contact position U, and a normal contact position N.

During a numerical sorting operation for a two digit number represented in a single column such as previously described with respect to the coding series B1, B2, E, G1 and G2, it is necessary that the numbers be sorted first with respect to the units digit and then with respect to the tens digit. The setting of the switches S2 and S4 enables the electrical circuits associated with the sorting operation to be conditioned such that when the switches S2 and S4 are each set in the units contact position U, a sorting operation will be performed on the units digit of a two digit number and then when the switches S2 and S4 are each set in the tens contact position T, a sorting operation will be performed on the tens digit of a two digit number. In all other sorting operations the switch S2 and S4 are set in the normal position.

The numerical order switches S2 and S4 have been shown as two separate switches in order to make the operation of the switches easier to understand. In actual practice the switches S2 and S4 are constructed as a complete unit consisting of a pair of wiping arms constructed and arranged to be commonly shifted so as to engage one of the contacts T, U or N of the series of contacts associated with each arm.

In the coding arrangement previously described some of the series combinations are divided into two groups such as subseries A1 and A2, B1 and B2, D1 and D2, F1 and F2, and G1 and G2 where the distinction between the coding notations of two associated groups, such as A1 and A2, is only in the transposition of the two lower decks.

The positioning of the code group differentiating switch S3 enables those coding notations of two associated groups relating to a common designation to be stored in the same storage tube and sorted into the same card pocket.

The code group differentiating switch S3 has two contact positions code I and code II in addition to a common normal contact position N such that when the switch is shifted to the left the contacts code I and N are engaged by the contact arm and when shifted to the right the contacts code II and N are engaged by the contact arm. The code I contacts are connected jointly to the code II contacts and contacts U of the switch S2 while the contacts N of switch S3 are coupled jointly to the contacts T and N of the switch S2.

When a value, such as "3" of one coding group, is sensed in a detail card at the time that the switch S2 is in the contacts position N and the switch S3 is engaging, the contacts code I and N, a circuit will be completed through the sensed "8" perforation, switches S2 and S3, line 106, the "8" segment of brush pulse distributor BPD1 to the control grid of the storage tube T8. But when a value, such as "3" of an associated coding group, which occupies a transposed position in the detail card from that of the value "8" of an associated coding group, is sensed at the time that the switch S2 is in the contacts position N and the switch S3 has been shifted so as to now engage contacts code II and N, a circuit will be completed through the sensed "3" perforation, switches S2 and S3, line 107, "3" segment of the brush pulse distributor BPD2, which segment is cross coupled to the storage tube T8. Thus it is to be noted that upon sensing two values which occupy transposed positions in a detail card of two associated coding groups that the two values will be stored in the same storage tube.

The machine having been started in the manner described above, the sensing of a "9" hole in a record card in conjunction with the making of the cam controlled contacts CR1 (Fig. 2*a*) at 22.5° machine time as shown in the timing diagram of Fig. 17*a* of the first card cycle causes a positive pulse to be applied to the control grid of the negatively biased gas tube T9 (Fig. 2*b*) resulting in the control grid potential thereof being increased above the firing point thereof. It is to be noted that the battery B biases the control grid of the gas tube T9, as well as all of the other gas tubes, with respect to the cathode and that there is one storage tube for each corresponding index point position.

The circuit to the control grid of T9 may be traced from line 100, line 104, card lever contacts CLC2 now closed, resistor RR3, contacts CR1 now closed (see Fig. 17*a*), brush B5, sensed "9" hole in the record card, contact roll, brush B6, switch S2 in the normal position N, switch S3 in the normal position N, line 106, brush 110 of the distributor BPD1, "9" segment of BPD1, line 230, resistor RR4 to the control grid of storage tube T9.

With the potential of the control grid of T9 increased to the firing potential thereof and inasmuch as the anode potential is supplied to T9 when the cam controlled contacts CR3 (Fig. 2b) close at 20° machine time (see Fig. 17*a*), the tube T9 is made conductive whereby the sensed value "9" is stored therein.

The brushes 110 and 111 of the respective brush pulse distributors BPD1 and BPD2 (Fig. 2*a*) are adapted to be connected serially to the brush B6 at separate times and under different conditions as determined by the settings of the switches S2 and S3. The brushes 110 and 111 are driven in such a manner as to make successive contact with the individual segments 9, 8, 7, 6, 5 . . . 12 of the respective distributor units. The segments of the distributors are engaged by the respective brushes 110 and 111 in the same sequence and order that the index point positions of the detail card are sensed by the brush B6. When the brush B6 senses a perforation in one of the index point positions of a detail card, a positive pulse will be applied to the corresponding storage tube through the corresponding segment of the distributor BPD1. The functioning of the distributor BPD2 will be described subsequently.

The sensed value "9" is stored in the ionized tube T9 until the cam controlled contacts CR4 (Fig. 2*c*) make at 300° machine time (Fig. 17*a*). At that time the relay R21 (Fig. 2*c*) is energized and the contacts R21*h* closed causing the data stored in the tube T9 to be transferred to the pick-up coil of the relay R9. The circuit transferring the storage of the data may be traced from the anode of T9, resistor RR7, contacts R21*h* (Fig. 2*c*) now closed, pick-up coil of relay R9, line 122, line 123, cam controlled contacts CR3 now closed, to the line 100. The energization of the relay R9 causes the contacts R9*a* in the hold circuit of said relay to close as well as causing the contacts R9*b*, R9*c*, R9*d* . . . and R9*n* in the decoding network (Fig. 2*d*) to shift contact positions.

At 332° machine time the cam controlled contacts CR6 (Fig. 2*c*) close thereby enabling a hold circuit to be made for the relay R9 which circuit may be traced from the line 100, line 124, hold coil of relay R9, resistor RR8, contacts R9*a* now closed due to the energization of the pickup coil of R9, normally closed contacts R22*e*, contacts CR6 now closed, line 125 to the line 101.

At 350° machine time the cam controlled contacts CR3 open thereby restoring the tube T9 and the pickup coil of the relay R9 to an original operating condition in preparation for the sensing operation of the following detail card during the next card cycle.

During the following card cycle at 22.5° machine time when the cam controlled contacts CR5 close (see Figs. 2*d* and 17*b*), a circuit is completed from line 100, brush B3, "9" segment of the sort commutator SC, brush B4, cam controlled contacts CR5 now closed, common strip of the pocket sort emitter SE, "9" segment of the emitter SE, line 112, line 113, contacts R9*b* now closed, line 114, standard sort contacts A coupled to contacts B of the code selector switch CSS (Fig. 2*f*), line 115, sort relay SR, parallel combination of the resistors RR9, RR10 and capacitor C1, sort magnet SM (Fig. 2*d*) to the line 101 whereby the sort relay SR is energized and the contacts SR1 thereof closed. Upon being energized, the sort magnet SM causes the armature 62 (Fig. 1) to be lowered whereby the record card is directed over the "9" chute blade into the "9" pocket.

After the contacts SR1 are closed a hold circuit for the sort magnet SM is set up which may be traced from the line 100, brush B1, conductive segment 118 of the hold sort commutator HSC, brush B2, contacts SR1 now closed, relay SR, magnet SM to the line 101.

The selecting commutator may be substantially identical with the commutator described in Patent No. 1,741,985 and need not be described in detail herein as it is well known and described fully in said patent.

The commutator SC has the customary common brush B3 by which the commutator is connected to the line 100. There are twelve conductive segments 116 corresponding to the twelve index point positions in the detail card columns which are adapted to make contact with the brush B4 successively and can be made conducting to the common ring 117 with which brush B3 cooperates as described in the aforesaid patent.

The commutator SC is provided with an additional brush B2 and segment 118 forming the hold sort commutator HSC which preferably is formed as part of the common ring 117 but for convenience will be treated here as if it were a separate commutator entirely and provided with a common brush B1 coupled to the line 100 and a continuous contact ring (not shown) of which the segment 118 is a part.

The commutator HSC is adapted to hold the circuit established through the commutator SC until the twelve position of the card has passed the analyzing brush B6. This insures that the sort blades remain in their displaced relationship until such time as the holding circuit is broken. This device is well explained in the patent referred to and requires no further detailed explanation.

At 285° machine time of the second card cycle, the cam controlled contacts CR2 (Fig. 2*c*) make and establish a circuit from the line 101, line 125, contacts CR2, relay R22, line 122, line 123, contacts CR3 to the line 100 whereby the relay R22 is energized and the associated contacts R22*e* opened. Prior to the contacts R22*e* being opened, the cam controlled contacts CR6 open at 283° machine time which prevents arcing when the hold points R22*e* open at 285° machine time.

When the contacts R22*e* open, the hold circuit is restored to an original condition in readiness for another sorting cycle.

Thus it is to be noted that the "9" value in the detail card was sensed during the first cycle and sorted during the second cycle at a time when the corresponding position on the following card is being sensed.

While the foregoing description has been specific to the sensing and the sorting of a record card having a "9" perforation, it should be noted that the same operation takes place for any other perforated index position within the column being sent so as to distribute the sensed cards into the corresponding card pocket.

Likewise it should be noted during the second card cycle that the sensed detail card is being sorted into the designated pocket at the time when the next following card is selectively energizing one of the gas storage tubes.

It may also be pointed out that as is customary, the single hole in a digital position may be accompanied by a second hole in the X or Y position for identification purposes such as "negative" or "positive." In such cases the X and Y holes will fire their related tubes T11 or T12 and these in turn will energize related relays R19 and R20 respectively. However, these latter relays will have no effect on the ultimate sorting because with switch CSS set at "Standard sort" the sort circuit will be completed at the "9" time (for a 9 and X combination) and again, later at the "11" time, with the latter having no effect since the sorting blades will have already been tripped at such time.

SORTING SERIES A1

Now assume that those cards bearing the code notation for the character *a* of subseries A1 of the index series are to be deposited in the card pocket set aside for such a character. Referring to Fig. 3 it is noted that the code notation for this character is represented in a detail card by a combination of holes punched in the 9, 8, 7, 6 and 5 index point positions.

In order to effect a sorting operation of this character of the index series it is necessary that the numerical order switches S2 (Fig. 2*a*) and S4 (Fig. 2*e*) be in the normal position N; that since a search is to be made of group 1 of series A, the switch S3 be in the contact position as shown in Fig. 2*a*; and that the code selector switch CSS (Fig. 2*f*) be shifted such that the brushes 252 bridge the contacts along line A–F to the contacts along the line G–P whereby the switch CSS is conditioned for the sorting of the characters A–F of the code series A1. It is to be noted that since the series A1 comprises more than 10 characters that three contact positions of the switch CSS have been set aside for the series A1 thereby necessitating three sorting operations in order to completely sort this code.

When a detail card is detected bearing the code notation 9, 8, 7, 6 and 5 representing the character *a*, a circuit is established from line 100, line 104, contacts CLC2, resistor RR3, contacts CR1 which close for each index point position (see Fig. 17*a*), a brush B5 "9," "8," "7," "6" and "5" index point positions in the detail card, contact roll, brush B6, switch S2 in a normal position, switch S3 in position as shown, line 106, the corresponding "9," "8," "7," "6" and "5" segments of BPD1, respective lines 230, 231, 232, 233 and 234 to the control grid of the corresponding tubes T9, T8, T7, T6 and T5 causing the tubes to be made conducting and resulting in the sensed values being stored therein.

At 300° machine time, the contacts CR4 close (see Fig. 17*a*) causing the relay R21 (Fig. 2*c*) to become energized and the contacts R21*h*, R21*j*, R21*k*, R21*n* and R21*m* corresponding to the sensed index point positions to be closed. The closing of the contacts R21*h* causes the pickup coil of the relay R9 to be energized and the associated contacts to be closed whereby the data stored in T9 is transferred to the relay R9. In a like manner, the information stored in the tubes T8, T7, T6 and T5 is transferred to the respective pickup coils of the relay R7 and R8, R5 and R6, R3 and R4, and R1 and R2 and the respective contacts R7*a*, R5*a*, R3*a* and R1*a* closed.

The hold circuit for each of the aforementioned relays is set up when the contacts CR6 close at 322° machine time while at 353° machine time the contacts CR3 open causing the tubes T9, T8, T7, T6 and T5 and the pickup coils associated therewith to drop out.

During the next card cycle a circuit will be established through the decoding relays and the switch CSS to the sort magnet SM whereby the card will be sorted into a card pocket with a related designation. This circuit will be established when the sort commutator SC (Fig. 2*d*) is on the "4" segment and may be traced from line 100, brush B3, segment "4" of the sort commutator SC, brush B4, contacts CR5 now closed, "4" segment of the sort commutator, contacts R2*d* now shifted due to relay R2 being held, contacts R3*m* now shifted due to relay R3 being held, contacts R6*b* now shifted due to relay R6 being held in an energized condition, contacts R8*g* now shifted due to relay R8 being held, contacts R9*k* shifted, line 205, jumpered contacts C and D of the switch CSS (Fig. 2*f*), line 115, relay SR (Fig. 2*d*), parallel combination of resistors RR9 and RR10 and capacitor C1, sort magnet SM to the line 101. Upon being energized, the sort magnet SM will operate the chute blade at "4" index time causing the card to be sorted into the appropriate card pocket.

At 285° machine time of the second card cycle, the cam controlled contacts CR2 (Fig. 2*c*) make (see Fig. 17*b*) causing the relay R22 to be energized and the contacts R22*a*, R22*b*, R22*c*, R22*d* and R22*e* to open thereby dropping the holding circuit for the relays R1 to R9, inclusive.

While the sorting of a specific character of *a* within the subgroup A–F of the group A1 has been described, it is to be noted that the remaining characters of this subgroup will be sorted into a related designated pocket. Those data bearing cards containing code notations of all other series will be deposited in the reject pocket.

Since three sorting operations are necessary to complete the sorting of cards bearing the code notations of group A1, a preliminary sorting operation will be performed on those record cards containing a code notation assigned to the remaining subgroups G–P and Q–Z of the series A1. Those cards bearing the code notations for the characters G–P of series A1 will be sorted into the eleven card pocket while those cards bearing the code notations for the characters Q–Z of series A1 will be sorted into the twelve card pocket. Thus after sorting the cards within the subgroup A–F of series A1 into the appropriate card pockets, the record cards bearing the next subgroup of series A1 to be sorted will all be in a single card pocket ready to be completely sorted.

An example of this preliminary sorting operation will now be given. Assuming that the subgroup A–F of series A1 is to be sorted and that a record card bearing the code notations "8," "7," "6," "5," and "1" for the character *g* of the series A1 has been sensed. These values will be stored in the respective relays R1 and R2, R3 and R4, R5 and R6, R7 and R8, R12 and R13 in the manner as previously described.

At "11" index point time a circuit will be established which will cause this card bearing the character *g* in codified form to be deposited in the eleven card pocket. This circuit may be traced from line 100, brush B3 (Fig. 2*d*), "11" segment of sort commutator SC, brush B4, contacts CR5 now closed, "11" segment of the sort emitter SE, line 255, coupled contacts I and D′ of the switch CSS (Fig. 2*f*), line 204, contacts R18*g* (Fig. 2*e*) as shown, contacts R17*c* as shown, contacts 15*c* as shown, contacts R13*c* shifted, contacts R11*c* as shown, line 118, contacts E′ coupled to contacts Z′ of the switch CSS, line 256, contacts R9*d* (Fig. 2*d*) as shown, contacts R7*f*, R5*e*, R3*d*, R1*c* all shifted, relay SR, resistors RR9 and RR10 in parallel, sort magnet SM to the line 101 whereby the sort magnet is energized causing the card to be deposited into the eleven card pocket.

Likewise, carrying the assumption one step further, let it be assumed that a card bearing a code notation for one of the characters within the subgroup Q–Z is sensed at the time that the subgroup A–F of series A1 is being sorted into the proper card pockets. For example, a card having perforations in the "3," "5," "6," "7," and "8" index point positions and representing the character *q* will be sorted into the twelve card pocket as will all other record cards bearing characters assigned to the subgroup Q–Z. The circuit enabling this card bearing the character *q* in codified form to be deposited in the twelve card pocket may be traced from line 100, brush B3 (Fig. 2*d*), "12" segment of sort commutator SC, brush B4, contacts CR5 now closed, "12" segment of the sort emitter SE, line 257, contacts E2 of switch CSS coupled to contacts A2, line 208, contacts R18*e* (Fig. 2*e*) as shown, contacts R17*a* shifted, contacts R15*a*, R13*c* and R11*c* all as shown, line 118, contacts E′ of switch CSS (Fig. 2*f*) coupled to contacts F′, line 256, contacts R9*d* (Fig. 2*d*) as shown, contacts R7*f*, R5*e*, R3*d*, arm R1*c* all shifted, sort relay SR, resistors RR9 and RR10 in parallel, sort magnet SM to the line 101.

There is arranged below in tabular form a representative group of code notations for series A1 showing the storage relays energized, and the complete sorting circuit through the decoding relays and the switch CSS to the sort magnet SM. In the case of the code notations within the subgroup G–P, the switch CSS is positioned so as to bridge the contacts along the line G–P with the contacts along the line Q to Z while in the case of the code notations within the subgroup Q–Z, the switch CSS is positioned so as to engage the contacts along the line Q–Z with the contacts along the line of code B.

*Series A1*

CHARACTER

| b | f | g | k | l | p | q | u | v | z |
|---|---|---|---|---|---|---|---|---|---|
| CODE NOTATION | | | | | | | | | |
| 0<br>5<br>6<br>7<br>8 | 0<br>6<br>7<br>8<br>9 | 1<br>5<br>6<br>7<br>8 | 1<br>6<br>7<br>8<br>9 | 2<br>5<br>6<br>7<br>8 | 2<br>6<br>7<br>8<br>9 | 3<br>5<br>6<br>7<br>8 | 3<br>6<br>7<br>8<br>9 | 4<br>5<br>6<br>7<br>8 | 4<br>6<br>7<br>8<br>9 |
| ENERGIZED STORAGE RELAYS | | | | | | | | | |
| R1<br>R2<br>R3<br>R4<br>R5<br>R6<br>R7<br>R8<br>R10<br>R11 | R3<br>R4<br>R5<br>R6<br>R7<br>R8<br>R9<br>R10<br>R11 | R1<br>R2<br>R3<br>R4<br>R5<br>R6<br>R7<br>R8<br>R12<br>R13 | R3<br>R4<br>R5<br>R6<br>R7<br>R8<br>R9<br>R12<br>R13 | R1<br>R2<br>R3<br>R4<br>R4<br>R6<br>R7<br>R8<br>R14<br>R15 | R3<br>R4<br>R5<br>R6<br>R7<br>R8<br>R9<br>R14<br>R15 | R1<br>R2<br>R3<br>R4<br>R5<br>R6<br>R7<br>R8<br>R16<br>R17 | R3<br>R4<br>R5<br>R6<br>R7<br>R8<br>R9<br>R16<br>R17 | R1<br>R2<br>R3<br>R4<br>R5<br>R6<br>R7<br>R8<br>R18 | R3<br>R4<br>R5<br>R6<br>R7<br>R8<br>R9<br>R18 |
| SORT COMMUTATOR | | | | | | | | | |
| 5 | 9 | 0 | 4 | 5 | 9 | 0 | 4 | 5 | 9 |
| SORTING CIRCUIT | | | | | | | | | |
| R2*e*<br>R4*b*<br>R6*d*<br>R8*j*<br>R9*n* | R2*j*<br>R4*h*<br>R6*h*<br>R8*k*<br>R9*n* | R1*d*<br>R3*e*<br>R5*f*<br>R8*a*<br>R9*f* | R2*d*<br>R3*k*<br>R5*k*<br>R8*d*<br>R9*f* | R2*e*<br>R4*b*<br>R6*d*<br>R8*j*<br>R9*n* | R2*j*<br>R4*h*<br>R6*h*<br>R8*k*<br>R9*n* | R1*d*<br>R3*e*<br>R5*f*<br>R8*a*<br>R9*f* | R2*d*<br>R3*k*<br>R5*h*<br>R8*d*<br>R9*f* | R2*e*<br>R4*b*<br>R6*d*<br>R8*j*<br>R9*n* | R2*j*<br>R4*h*<br>R6*h*<br>R8*k*<br>R9*n* |
| 200<br>A′–B′<br>201<br>R18*h*<br>R17*d*<br>R15*d*<br>R13*c*<br>R11*c*<br>118<br>E′–Z′<br>202<br>R9*d*<br>R7*f*<br>R5*e*<br>R3*d*<br>R1*c*<br>SM | | 203<br>C′–D′<br>204<br>R18*g*<br>R17*c*<br>R15*c*<br>R13*c*<br>R11*c*<br>118<br>E′–F′ | | 200<br>A′–G′<br>207<br>R18*f*<br>R17*b*<br>R15*a*<br>R13*c*<br>R11*c*<br>118<br>E′–F′<br>115<br>SM | | 203<br>C′–K′<br>208<br>R18*e*<br>R17*a*<br>R15*a*<br>R13*c*<br>R11*c*<br>118<br>F′–G<br>115<br>SM | | 200<br>I′–J′<br>212<br>R18*d*<br>R17*a*<br>R15*b*<br>R13*c*<br>R11*c*<br>118<br>F′–G<br>115<br>SM | |

A study of the above table will show that in the portion of the decoding relay network shown in Fig. 2*d* there is a common output in contacts R9*f* for those record cards which are to be deposited in card pockets 0–4 and a common output in contacts R9*n* for those record cards which are to be deposited in card pockets 5–9; that the electrical path selected to either of the contacts R9*f* or R9*n* is completed through four shifted relay contacts; that in the case of characters g to z that a complete sorting circuit is established only through a circuit having five shifted contacts; that the code selector switch CSS is instrumental in limiting the sorting operations to the subgroup selected; that there is a distinct electrical path through one of the contacts of relay R18 to the common output contacts R11*c* for those cards of series A1 bearing a perforation in the "0," "1," "2," "3," and "4" index point positions such that a circuit will be completed through the respective contacts R18*h*, R18*g*, R18*f*, R18*e* and R18*d* from the switch CSS to the contacts R11*c* which paths are the same as those completed for the preliminary sorting of the subgroups not selected in a particular sorting operation; and that the relays R1–9 are energized by perforations occurring in the lower deck of a record card while the relays 10–18 are energized by perforations occurring in the intermediate deck of a record card.

SORTING SERIES A2

When it is desired to effect a sorting operation of the coding notation of subseries A2, such as the combination of holes in the 4, 3, 2, 1 and 0 index positions representing the character A (Fig. 4), the switches S2 and S4 are placed in a normal position, switch S3 is shifted so as to engage the contacts code II and N, and the code selector switch bridges the contacts of lines A–F with the contacts of line Q–Z.

In this situation when the holes "4," "3," "2," "1" and "0" are detected in a detail card, a circuit is established which will cause the card to be sorted into a related designated card pocket. This circuit may be traced from line 100, line 104, contacts CLC2 now closed, resistor RR3, contacts CR1 closing at each index point as shown in Fig. 17, brush B5, the successively sensed index points "4," "3," "2," "1" and "0," contact roll, brush B6, normal position of switch S2, switch S3 now shifted to the right, line 107, brush 111 of BPD2, segments "4," "3," "2," "1" and "0" of the brush pulse distributor BPD2, corresponding lines 246, 245, 244, 243, and 242 connected to the associated lines 230, 231, 232, 233 and 234 which are, in turn, coupled to the control grid of the respective negatively biased tubes T9, T8, T7, T6 and T5 whereby the tubes are rendered conducting.

It is to be noted that the same tubes have been energized as in the case of the sorting operation concerning the character a̅ of series A1. Thus the remaining operations of the pickup and hold circuit and the decoding relays function in the same manner as previously described thereby resulting in the card being sorted into a related designated card pocket.

The brush pulse distributor BPD2 enables the transposition of the two lower decks of the series A1 and A2 to be taken into account such that the cross-coupling of the segments "4," "3," "2," "1" and "0" of BPD2 to the corresponding line coupled to segments "9," "8," "7," "6" and "5" of BPD1 results in the same storage tubes being energized as in the case of series A1 whereby the detail cards bearing different coding notations for the same basic character will be sorted into the same selected pocket.

SORTING SERIES B1

The sorting of a card bearing the card combination 7, 6, 5, 2, 0 representing the two digit number 0̅1 (see Fig. 5) may be effected by positioning the switches S2 and S4 on the units contact U, the switch S3 in the position as shown in Fig. 2*a*, and the code selector switch CSS such that the brushes 252 will energize the contacts of line code B with the contacts of line code C. Due to the limited number of card pockets available during a numerical sorting operation, it is necessary that the switches S2 and S4 be positioned initially for a units digit sorting and then for a tens digit sorting.

When a detail card is detected bearing the code notation for the number 01 during the first sorting operation, the following circuit will be established. From line 100 to line 104, contacts CLC2 now closed, resistor RR3, contacts CR1 closing at each index point, brush B5, sensed index point positions 7, 6, 5, 2 and 0, contact roll, brush B6, the units position of the switch S2, code I position of switch S3, line 107, brush 111, of BPD2 (Fig. 2*a*) successively contacting segments 7, 6, 5, 2, 0 of the brush pulse distributor BPD2, corresponding lines 249, 248, 247, 244 and 242 coupled to the associated lines 237, 238, 239, 232 and 234 which are, in turn, coupled to the negatively biased gas tubes T2, T1, T0, T7 and T5 (Fig. 2*b*) whereby the data sensed is stored within the tube in a manner as previously described.

When the contacts CR4 (Fig. 2*c*) close at 300° machine time causing the relay R21 to be energized the contacts R21*e*, R21*f*, R21*g*, R21*k* and R21*m* are closed whereby the data stored in the aforementioned gas tube are transferred to the relays R14 and R15, R12 and R13, R10 and R11, R5 and R6, and R1 and R2. At 332° a hold circuit is set up when the contacts CR6 (Fig. 2*c*) close, while at 350° machine time the contacts CR3 open thereby restoring the gas tubes and the pickup coils to their original position.

During the second card cycle the circuit is established through the "1" segment of the sort commutator SC (Fig. 2*d*) which circuit may be traced from line 100, brush B3, "1" segment of SC, brush B4, contacts CR5 now closed, "1" segment of the sort emitter SE, contacts R2*a* shifted due to relay R2 being energized, contacts R3*f* in a position as shown, contacts R5*k* now shifted due to the relay R5 being energized, contacts R8*b* in a position as shown, contacts R9*h* in a position as shown, line 221, contacts F jumpered to contacts E of CSS (Fig. 2*f*), the associated line 222, contacts R10*d* (Fig. 2*e*) now shifted due to R10 being energized, contacts R13*a* shifted due to relay R13 being energized, contacts R15*a* now shifted due to R15 being energized, contacts R16*d* as shown, contacts R18*c* as shown, line 121, through the units position of switch S4, line 118, contacts G coupled to contacts H of CSS (Fig. 2*f*), line 115, sort relay SR, parallel combination of resistors RR9 and RR10 and capacitor C1, sort magnet SM to the line 101 whereby the sort magnet becomes energized and those cards bearing the digit units representation of 0̲1̲ in codified form are sorted into the 1 pocket.

On the second sorting operation the switches S2 and S4 are placed in the tens unit position T and those cards which have been sorted into the one card pocket are operated upon again to determine if they satisfy the requirement in the tens digit position. When those cards bearing the code notation 7, 6, 5, 2, 0 are sensed a circuit will be established from the line 100, line 104, contacts CLC2 now closed, resistor RR3, contacts CR1 now closed, brush B5, sensed index positions 7, 6, 5, 2 and 0, contact roll, brush B6, tens position T of switch S2, code I position of switch S3, line 106, to the corresponding segments 7, 6, 5, 2 and 0 of BPD1, respective lines 232, 233, 234, 237 and 239 to the control grids of the corresponding tubes T7, T6, T5, T2 and T0 (Fig. 2*b*) whereby the aforementioned tubes are ionized causing the data sensed to be stored therein. Subsequently, in the same card cycle the data stored in the gas tubes are transferred to the associated pickup and holding relays. During the second card cycle the card will be sorted into the 0 card pocket when the sort commutator engages the 0 segment position. At this time the circuit may be traced from line 100, brush B3, 0 segment of the sort commutator SC (Fig. 2*d*), brush B4, contacts CR5 now closed, 0 segment of the sort emitter, contacts R1*d* now shifted due to the relay R1 being energized, contacts R3*e* now shifted due to the relay R3 being energized, contacts R5*f* now shifted due to the relay R5 being energized, contacts R8*a* in a position as shown, contacts R9*g* in a position as shown, line 209, contacts J coupled to contacts K of the switch CSS (Fig. 2*f*), line 220, contacts R18*k* in the position as shown, contacts 17*g* in the position as shown, contacts R15*f* now shifted due to relay R15 being energized, contacts R13*f* in a position as shown, contacts R11*d* now shifted due to the relay R11 being energized, tens position of the switch S4, line 118, contact G coupled to contact H of the switch CSS (Fig. 2*f*), line 115 to the sort relay SR, resistors RR9 and RR10 and capacitor C1 in parallel, sort magnet SM to line 161. Upon the completion of this circuit the magnet SM will be energized and the cards satisfying the various switch settings will be deposited into the 0 card pocket.

In the following table a representative group of code notations of the series B1 are set forth in addition to the circuits necessary to be completed for the proper sorting of these notations.

switches S2 and S4 to the tens position T. For example, to sort a card bearing perforations in the "8," "5," "2" and "0" index point positions, which are the code notations for the number 31 (see Fig. 7), the switches S2 and S4 for the first sorting operation should be in the units position U, the switch S3 in a position as shown in Fig. 2*a*, and the card selector switch CSS is shifted such that the brushes 252 bridge the contacts of the line code E with the contacts of the line code F. Upon sensing the perforations in the "8," "5," "2" and "0" index point positions a circuit is established through the distributor BPD2 whereby the values are first stored in the respective gas tubes T3, T0, T7 and T5 (Fig. 2*b*) and then transferred to the pickup coils of the respective relays R16 and R17, R10 and R11, R5 and R6 and R1 and R2 (Fig. 2*c*) in a manner as previously described. The hold circuits for the respective pickup coils

*Series B1*

| Units Sort | | | | | | | Tens Sort | | | | | | |
|---|---|---|---|---|---|---|---|---|---|---|---|---|---|
| CHARACTER | | | | | | | | | | | | | |
| 00 | 09 | 10 | 20 | 30 | 90 | 99 | 00 | 09 | 10 | 20 | 30 | 90 | 99 |
| CODE NOTATION | | | | | | | | | | | | | |
| 0<br>1<br>5<br>6<br>7 | 3<br>4<br>5<br>6<br>7 | 0<br>1<br>5<br>6<br>8 | 0<br>1<br>5<br>7<br>8 | 0<br>1<br>6<br>7<br>8 | 0<br>1<br>7<br>8<br>9 | 3<br>4<br>7<br>8<br>9 | 0<br>1<br>5<br>6<br>7 | 3<br>4<br>5<br>6<br>7 | 0<br>1<br>5<br>6<br>8 | 0<br>1<br>5<br>7<br>8 | 0<br>1<br>6<br>7<br>8 | 0<br>1<br>7<br>8<br>9 | 3<br>4<br>7<br>8<br>9 |
| ENERGIZED STORAGE RELAYS | | | | | | | | | | | | | |
| R1<br>R2<br>R3<br>R4<br>R10<br>R11<br>R12<br>R13<br>R14<br>R15 | R7<br>R8<br>R9<br>R10<br>R11<br>R12<br>R13<br>R14<br>R15 | R1<br>R2<br>R3<br>R4<br>R10<br>R11<br>R12<br>R13<br>R16<br>R17 | R1<br>R2<br>R3<br>R4<br>R10<br>R11<br>R14<br>R15<br>R16<br>R17 | R1<br>R2<br>R3<br>R4<br>R12<br>R13<br>R14<br>R15<br>R16<br>R17 | R1<br>R2<br>R3<br>R4<br>R14<br>R15<br>R16<br>R17<br>R18 | R7<br>R8<br>R9<br>R14<br>R15<br>R16<br>R17<br>R18 | R1<br>R2<br>R3<br>R4<br>R5<br>R6<br>R10<br>R11<br>R12<br>R13 | R1<br>R2<br>R3<br>R4<br>R5<br>R6<br>R16<br>R17<br>R18 | R1<br>R2<br>R3<br>R4<br>R7<br>R8<br>R10<br>R11<br>R12<br>R13 | R1<br>R2<br>R5<br>R6<br>R7<br>R8<br>R10<br>R11<br>R12<br>R13 | R3<br>R4<br>R5<br>R6<br>R7<br>R8<br>R10<br>R11<br>R12<br>R13 | R5<br>R6<br>R7<br>R8<br>R9<br>R10<br>R11<br>R12<br>R13 | R5<br>R6<br>R7<br>R8<br>R9<br>R16<br>R17<br>R18 |
| SORT COMMUTATOR | | | | | | | | | | | | | |
| 0 | 9 | 0 | 0 | 0 | 0 | 9 | 0 | 0 | 1 | 2 | 3 | 9 | 9 |
| SORTING CIRCUIT | | | | | | | | | | | | | |
| R1*d*<br>R3*e*<br>R5*f*<br>R8*b*<br>R9*h*<br>221<br>F–E<br>222<br>R10*d*<br>R13*a*<br>R15*a*<br>R16*d*<br>R18*c*<br>121<br>S4<br>118<br>G–H<br>115<br>SM | R2*j*<br>R4*k*<br>R6*k*<br>R8*n*<br>R9*h* | R1*d*<br>R3*e*<br>R5*f*<br>R8*b*<br>R9*h*<br>221<br>F–E<br>222<br>R10*d*<br>R13*a*<br>R14*d*<br>R16*d*<br>R18*c*<br>121<br>S4<br>118<br>G–H<br>115<br>SM | R1*d*<br>R3*e*<br>R5*f*<br>R8*b*<br>R9*h*<br>221<br>F–E<br>222<br>R10*d*<br>R12*d*<br>R14*d*<br>R16*d*<br>R18*c*<br>121<br>S4<br>118<br>G–H<br>115<br>SM | R1*d*<br>R3*e*<br>R5*f*<br>R8*b*<br>R9*h*<br>221<br>F–E<br>222<br>R10*c*<br>R12*d*<br>R14*d*<br>R16*d*<br>R18*c*<br>121<br>S4<br>118<br>G–H<br>115<br>SM | R1*d*<br>R3*e*<br>R5*f*<br>R8*b*<br>R9*h*<br>221<br>F–E<br>222<br>R10*c*<br>R12*c*<br>R14*c*<br>R16*c*<br>R18*c*<br>121<br>S4<br>118<br>G–H<br>115<br>SM | R2*j*<br>R4*k*<br>R6*k*<br>R8*n*<br>R9*h*<br>221<br>F–E<br>222<br>R10*c*<br>R12*c*<br>R14*c*<br>R16*c*<br>R18*c*<br>121<br>S4<br>118<br>G–H<br>115<br>SM | R1*d*<br>R3*e*<br>R5*f*<br>R8*a*<br>R9*g*<br>209<br>J–K<br>220<br>R18*k*<br>R17*g*<br>R15*g*<br>R13*f*<br>R11*d*<br>S4<br>118<br>G–H<br>115<br>SM | R1*d*<br>R3*e*<br>R5*f*<br>R8*a*<br>R9*g*<br>209<br>J–K<br>220<br>R18*k*<br>R17*e*<br>R15*e*<br>R13*e*<br>R11*d*<br>S4<br>118<br>G–H<br>115<br>SM | R2*a*<br>R3*f*<br>R5*h*<br>R8*e*<br>R9*g*<br>209<br>J–K<br>220<br>R18*k*<br>R17*g*<br>R15*g*<br>R13*f*<br>R11*d*<br>S4<br>118<br>G–H<br>115<br>SM | R2*b*<br>R3*h*<br>R5*n*<br>R8*e*<br>R9*g*<br>209<br>J–K<br>220<br>R18*k*<br>R17*g*<br>R15*g*<br>R13*f*<br>R11*d*<br>S4<br>118<br>G–H<br>115<br>SM | R2*c*<br>R3*n*<br>R5*n*<br>R8*e*<br>R9*g*<br>209<br>J–K<br>220<br>R18*k*<br>R17*g*<br>R15*g*<br>R13*f*<br>R11*d*<br>S4<br>118<br>G–H<br>115<br>SM | R2*j*<br>R4*k*<br>R6*j*<br>R8*f*<br>R9*g*<br>209<br>J–K<br>220<br>R18*k*<br>R17*g*<br>R15*g*<br>R13*f*<br>R11*d*<br>S4<br>118<br>G–H<br>115<br>SM | R2*j*<br>R4*k*<br>R6*j*<br>R8*f*<br>R9*g*<br>209<br>J–K<br>220<br>R18*k*<br>R17*e*<br>R15*e*<br>R13*e*<br>R11*d*<br>S4<br>118<br>G–H<br>115<br>SM |

SORTING E SERIES

Figure 2B:
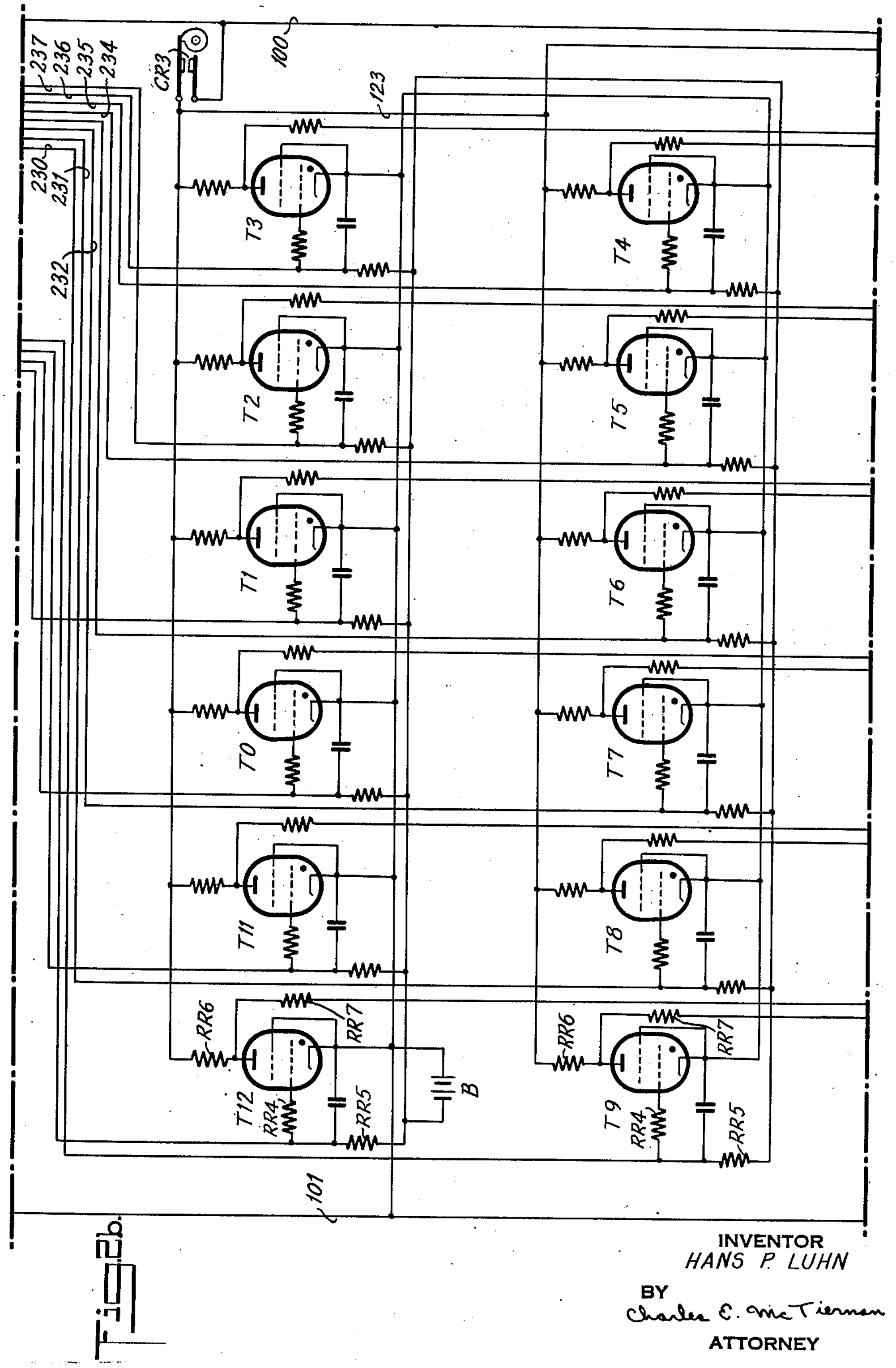
Figure 2C:
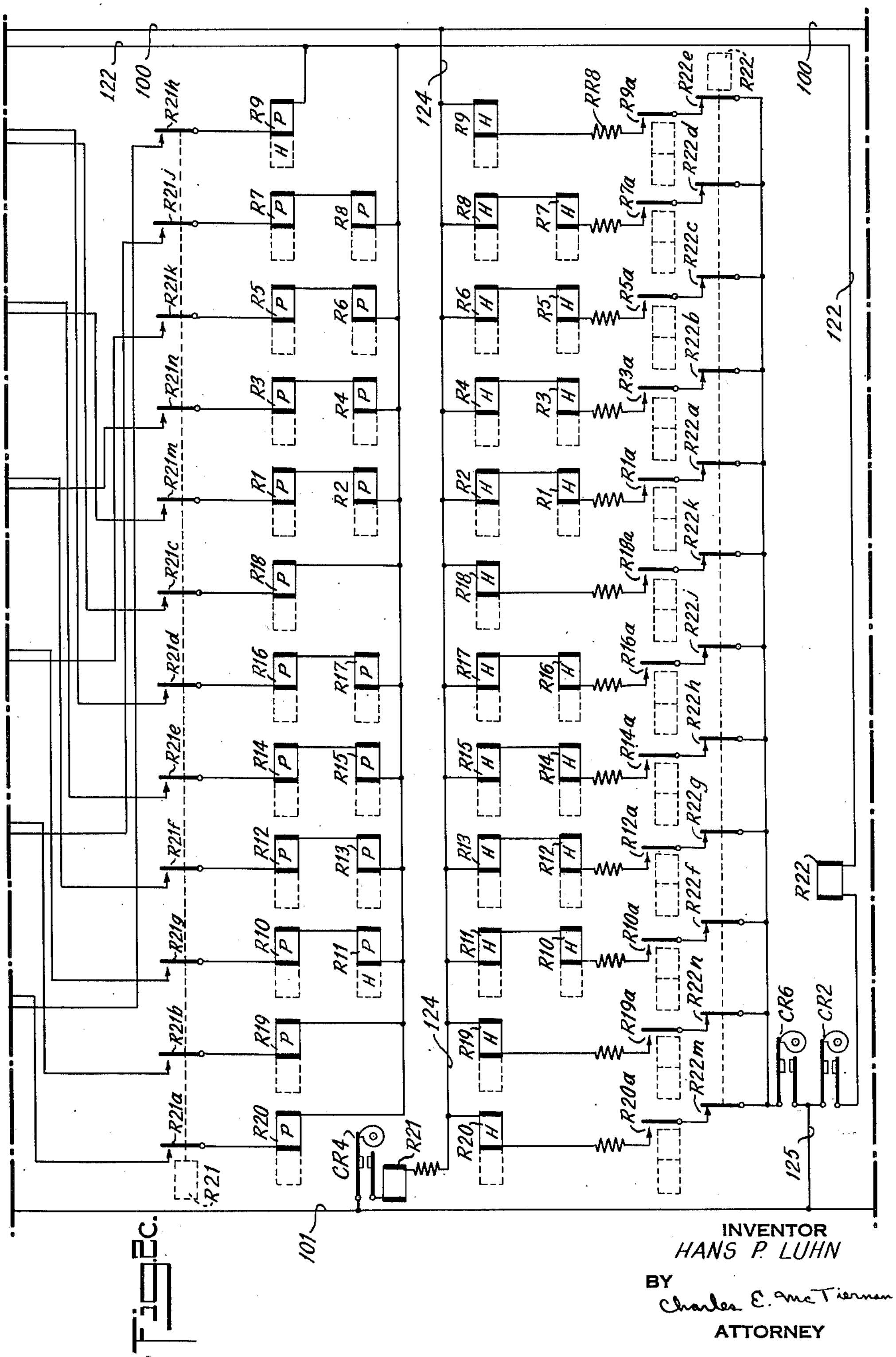

In order to perform a sorting operation upon those cards bearing the E series coding notation for the numbers ,00 to ,99 it is necessary to analyze the detail cards in a particular column first for the unit digit by setting the switches S2 and S4 to the units position U thereof and then in the same column for the tens digit by shifting the are established such that the data is retained over to the next card cycle during which cycle the card is sorted into the one card pocket. The circuit which will cause the record card to be sorted into the designated pocket may be traced from line 100, brush B3, one segment of the sort commutator SC (Fig. 2*d*), brush B4, contact CR5 closing at respective index point positions, segment one of the sort emitter SE, contacts R2*a* (Fig. 2*d*)

shifted, contacts R3*f* as shown, contacts R5*k* shifted due to the relay R5 being energized, contacts R8*b* as shown, contacts R9*h* as shown, line 221, contacts S jumpered to contacts R of the selector switch CSS (Fig. 2*f*), line 224, contacts R11*a* (Fig. 2*e*) shifted due to R11 being energized, contacts R13*a* as shown, contacts R14*d* as shown, contacts R16*d* shifted, contacts R18*c* as shown, line 121, switch S2, line 118, contacts T jumpered to contacts U of CSS (Fig. 2*f*), line 115, sort relay SR, parallel resistors RR9 and RR10, sort magnet SM to the line 101. All those cards which are sorted into the one card pocket are removed and placed in the card feed hopper in order to be analyzed with respect to the tens digit. In this situation the switches S3 and CSS remain in the same position as used in the units digit sorting operation while switches S2 and S4 are shifted to the tens position thereof. Here the values 8, 5, 2 and 0 upon being sensed cause the information to be stored in the respective gas tubes T8, T5, T2 and T0 (Fig. 2*b*). After the stored data has been transferred to the pickup coils of the respective relays R7 and R8, R1 and R2, R14 and R15, and R10 and R11, a hold circuit is then set up for each pickup coil in order that the detail card or cards bearing the code notation for the number 31 will be deposited in the three card pocket during the second card cycle. The circuit established to accomplish this result may be traced from line 100, brush B3, three segment of sort commutator SC, brush 134, CR5 closing at the respective index point position, three segment of the sort emitter (Fig. 2*d*), contacts R2*c* shifted, contacts R3*k* as shown, contacts R5*m* as shown, contacts R8*b* shifted due to the relay R8 being energized, contacts R9*h* as shown, line 221, contacts W jumpered to contacts X of the switch CSS (Fig. 2*f*), line 220, contacts R18*k* as shown, contacts R17*g* as shown, contacts R15*f* shifted due to relay R15 being energized, contacts R13*f* as shown, contacts R11*d* shifted due to the relay R11 being energized, switch S2, the line 118, contacts T jumpered to contacts U of the selector switch CSS, line 115, sort relay SR, sort magnet SM to the line 101 whereby the sort magnet SM becomes energized at 3 time and causes the card to be sorted into the three card pocket. At 285° machine time the holding circuits are dropped in the manner as previously described and the circuits are placed in a condition to hold those values sensed in a following card at the time that the leading card was being sorted.

In the table listed below there is set forth in a group of columns a representative group of characters of series E with each column of the table showing the code notations for the numerical character, the storage relays energized upon the detecting of the code notations within a detail card, the segment of the sort commutator through which a pulse will be delivered to the conditioned sorting circuit which is traced through the decoding relays and the switch CSS to the sort magnet SM.

*Series E*

| Units Sort | | | | | | Tens Sort | | | | | |
|---|---|---|---|---|---|---|---|---|---|---|---|
| CHARACTER | | | | | | | | | | | |
| 00 | 09 | 10 | 20 | 30 | 90 | 00 | 09 | 10 | 20 | 30 | 90 |
| CODE NOTATIONS | | | | | | | | | | | |
| 0<br>1<br>5<br>6 | 2<br>4<br>5<br>6 | 0<br>1<br>5<br>7 | 0<br>1<br>6<br>7 | 0<br>1<br>5<br>8 | 0<br>1<br>8<br>9 | 0<br>1<br>5<br>6 | 2<br>4<br>5<br>6 | 0<br>1<br>5<br>7 | 0<br>1<br>6<br>7 | 0<br>1<br>5<br>8 | 0<br>1<br>8<br>9 |
| ENERGIZED STORAGE RELAYS | | | | | | | | | | | |
| R1<br>R2<br>R3<br>R4<br>R10<br>R11<br>R12<br>R13 | R7<br>R8<br><br>R9<br>R10<br>R11<br>R12<br>R13 | R1<br>R2<br>R3<br>R4<br>R10<br>R11<br>R14<br>R15 | R1<br>R2<br>R3<br>R4<br>R12<br>R13<br>R14<br>R15 | R1<br>R2<br>R3<br>R4<br>R10<br>R11<br>R16<br>R17 | R1<br>R2<br>R3<br>R4<br>R16<br>R17<br><br>R18 | R1<br>R2<br>R3<br>R4<br>R10<br>R11<br>R12<br>R13 | R1<br>R2<br>R3<br>R4<br>R16<br>R17<br><br>R18 | R1<br>R2<br>R5<br>R6<br>R10<br>R11<br>R12<br>R13 | R3<br>R4<br>R5<br>R6<br>R10<br>R11<br>R12<br>R13 | R1<br>R2<br>R7<br>R8<br>R10<br>R11<br>R12<br>R13 | R7<br>R8<br>R9<br><br>R10<br>R11<br>R12<br>R13 |
| SORT COMMUTATOR | | | | | | | | | | | |
| 0 | 9 | 0 | 0 | 0 | 0 | 0 | 0 | 1 | 2 | 3 | 9 |
| SORTING CIRCUIT | | | | | | | | | | | |
| R1*a*<br>R3*e*<br>R5*f*<br>R8*b*<br>R9*h*<br><br>221<br>S–R<br>224<br>R11*a*<br>R13*b*<br>R15*a*<br>R16*d*<br>R18*c*<br>121<br>S4<br>118<br>T–U<br>115<br>SM | R2*j*<br>R4*k*<br>R6*k*<br>R8*n*<br>R9*h* | R1*a*<br>R3*e*<br>R5*f*<br>R8*b*<br>R9*h*<br><br>221<br>S–R<br>224<br>R11*a*<br>R13*a*<br>R15*a*<br>R16*d*<br>R18*c*<br>121<br>S4<br>118<br>T–U<br>115<br>SM | R1*a*<br>R3*e*<br>R5*f*<br>R8*b*<br>R9*h*<br><br>221<br>S–R<br>224<br>R10*d*<br>R13*a*<br>R15*a*<br>R16*d*<br>R18*c*<br>121<br>S4<br>118<br>T–U<br>115<br>SM | R1*a*<br>R3*e*<br>R5*f*<br>R8*b*<br>R9*h*<br><br>221<br>S–R<br>224<br>R11*a*<br>R13*a*<br>R14*d*<br>R16*d*<br>R18*c*<br>121<br>S4<br>118<br>T–U<br>115<br>SM | R1*a*<br>R3*e*<br>R5*f*<br>R8*b*<br>R9*h*<br><br>221<br>S–R<br>224<br>R10*d*<br>R12*d*<br>R14*c*<br>R16*c*<br>R18*c*<br>121<br>S4<br>118<br>T–U<br>115<br>SM | R1*d*<br>R3*e*<br>R5*f*<br>R8*b*<br>R9*h*<br><br>221<br>W–X<br>220<br>R18*k*<br>R17*g*<br>R15*g*<br>R13*f*<br>R11*d*<br>S4<br>118<br>T–U<br>115<br>SM | R1*d*<br>R3*e*<br>R5*f*<br>R8*b*<br>R9*h*<br><br>221<br>W–X<br>220<br>R18*k*<br>R17*e*<br>R15*e*<br>R13*e*<br>R11*d*<br>S4<br>118<br>T–U<br>115<br>SM | R2*a*<br>R3*f*<br>R5*k*<br>R8*b*<br>R9*h*<br><br>221<br>W–X<br>220<br>R18*k*<br>R17*g*<br>R15*g*<br>R13*f*<br>R11*d*<br>S4<br>118<br>T–U<br>115<br>SM | R2*b*<br>R3*j*<br>R5*k*<br>R8*b*<br>R9*h*<br><br>221<br>W–X<br>220<br>R18*k*<br>R17*g*<br>R15*g*<br>R13*f*<br>R11*d*<br>S4<br>118<br>T–U<br>115<br>SM | R2*c*<br>R3*k*<br>R5*m*<br>R8*a*<br>R9*h*<br><br>221<br>W–X<br>220<br>R18*k*<br>R17*g*<br>R15*g*<br>R13*f*<br>R11*d*<br>S4<br>118<br>T–U<br>115<br>SM | R2*j*<br>R4*k*<br>R6*k*<br>R8*n*<br>R9*h*<br><br>221<br>W–X<br>220<br>R18*k*<br>R17*g*<br>R15*g*<br>R13*f*<br>R11*d*<br>S4<br>118<br>T–U<br>115<br>SM |

SORTING C SERIES

Figure 8:
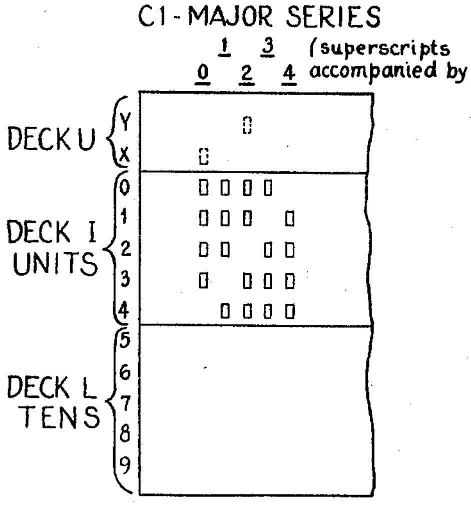

A card punched in the "4," "3," "2" and "1" index point positions represents the value 4 in superscript form as shown in the series C1 of Fig. 8. In order to effect a sorting operation of values within this coding arrangement the switches S2 and S4 are placed in the normal position thereof, switch S3 is positioned as shown in Fig. 2*a* and the code selector switch CSS has been shifted so that the brushes 252 will bridge the contacts of line code C with the contacts of the 1 digit line of code D. When the index point positions "4," "3," "2" and "1" are successively sensed in the detail card a circuit is established from line 100, line 104, contacts CLC2 now closed, resistor RR3, contact CR1 closing at the respective index point positions, brush B5, sensed index point positions "4," "3," "2" and "1," contact roll, brush B6, switch S2, switch S3, line 106, the respective 4, 3, 2 and 1 segments of BPD1, corresponding lines 235, 236, 237 and 238 to the control grid of the negatively biased gas tubes T4, T3, T2 and T1 whereby the tubes are rendered conductive and the sensed values are stored therein.

At 300° machine time the cam controlled contacts CR4 (Fig. 2*c*) make causing the relay R21 to be energized and the contacts R21*c*, R21*d*, R21*e* and R21*f* associated therewith to be closed. The closing of the contacts of the relay R21 causes the pickup coils of the relays R18, R16 and R17, R14 and R15, R12 and R13 to be energized thereby transferring thereto the data stored in the respective tubes T4, T3, T2 and T1. When the storage pickup coils are energized the contacts R18*a*, R16*a*, R14 and R12*a* are closed thereby enabling a holding circuit to be set up for the respective pickup coils when the cam controlled contacts CR6 close as shown in the timing diagram of Fig. 17.

At 350° machine time the cam controlled contact CR3 opens causing the energized gas tubes T4, T3, T2 and T1 to be returned to their original unenergized state in preparation for a storing operation in the next following card cycle. During the next card cycle at 4 index point time a circuit is established which will cause the detail card to be sorted into the 4 card pocket. This circuit may be traced from line 100, brush B3, segment 4 of the sort commutator (Fig. 2*d*), brush B4, contacts CR5 now closed, segment 4 of the sort emitter SE, line 119, contacts R11*e* as shown, contacts R13*g* shifted due to R13 being energized, R15*h* shifted due to R15 being in an energized condition, R17*h* now shifted due to the relay R17 being energized, R18*n* now shifted due to R18 being energized, line 214, contacts L jumpered to contacts M of the switch CSS (Fig. 2*f*), line 216, contacts R9*c* (Fig. 2*d*) as shown, contacts R7*c* as shown, contacts R5*c* as shown, contacts R3*c* as shown, contacts R1*c* as shown, sort relay SR, resistors RR9 and RR10 and capacitor C1 in parallel, sort magnet SM to the line 101 whereby the sort magnet is energized at 4 index point time causing the detail card to be sorted into the 4 pocket.

Figure 9:
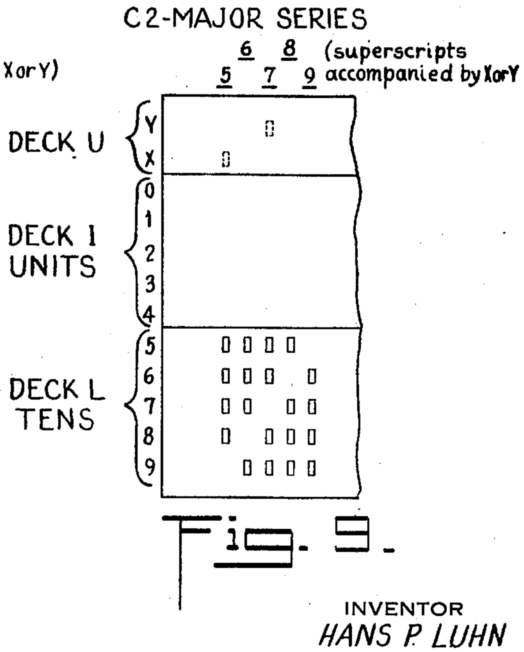

At 285° machine time of the second card cycle the cam controlled contacts CR2 make resulting in the relay R22 being energized thereby causing the hold circuits to be dropped. The sorting of those values represented within the subseries C1 and C2 of the C series of Figs. 8 and 9 are effected in the same manner with each of the subseries being sorted with switch S3 being in a normal position and not being set particularly for a subseries as in the case of the other coding series.

It is to be noted in the case of the C series and all those series which are identifiable by the presence of at least one perforation in the U deck that the decoding network operates only upon the perforation within the I and L decks of the card. In the coding arrangement just discussed, an open circuit will result when the 11 or 12 index point positions, whichever the case may be, are sensed in the card.

In the table below there is set forth all of the characters represented by the code notations of the series C1 and C2 in addition to the storage relays energized upon the detecting of the various code notations as well as the complete electrical circuit necessary to energize the sort magnet SM in each instance.

*Series C1—Series C2*

CHARACTERS

| 0 | 1 | 2 | 3 | 4 | 5 | 6 | 7 | 8 | 9 |
|---|---|---|---|---|---|---|---|---|---|
| CODE NOTATIONS | | | | | | | | | |
| 0<br>1<br>2<br>3 | 0<br>1<br>2<br>4 | 0<br>1<br>3<br>4 | 0<br>2<br>3<br>4 | 1<br>2<br>3<br>4 | 5<br>6<br>7<br>8 | 5<br>6<br>7<br>9 | 5<br>6<br>8<br>9 | 5<br>7<br>8<br>9 | 6<br>7<br>8<br>9 |
| ENERGIZED STORAGE RELAYS | | | | | | | | | |
| R10<br>R11<br>R12<br>R13<br>R14<br>R15<br>R16<br>R17 | R10<br>R11<br>R12<br>R13<br>R14<br>R15<br>R18 | R10<br>R11<br>R12<br>R13<br>R16<br>R17<br>R18 | R10<br>R11<br>R14<br>R15<br>R16<br>R17<br>R18 | R12<br>R13<br>R14<br>R15<br>R16<br>R17<br>R18 | R1<br>R2<br>R3<br>R4<br>R5<br>R6<br>R7<br>R8 | R1<br>R2<br>R3<br>R4<br>R5<br>R6<br>R9 | R1<br>R2<br>R3<br>R4<br>R7<br>R8<br>R9 | R1<br>R2<br>R5<br>R6<br>R7<br>R8<br>R9 | R3<br>R4<br>R5<br>R6<br>R7<br>R8<br>R9 |

Series C1—Series C2—Continued

<table>
<tr><td colspan="10">SORT COMMUTATOR</td></tr>
<tr><td>0</td><td>1</td><td>2</td><td>3</td><td>4</td><td>5</td><td>6</td><td>7</td><td>8</td><td>9</td></tr>
<tr><td colspan="10">SORTING CIRCUITS</td></tr>
<tr><td>213<br>R11j<br>R13k<br>R15k<br>R17j<br>R18n</td><td>215<br>R11h<br>R13j<br>R15j<br>R17h<br>R18n</td><td>217<br>R11g<br>R13h<br>R15h<br>R17h<br>R18n</td><td>218<br>R11f<br>R13h<br>R15h<br>R17h<br>R18n</td><td>119<br>R11e<br>R13g<br>R15h<br>R17h<br>R18n</td><td>R2e<br>R4b<br>R6d<br>R8j<br>R9n</td><td>R2f<br>R4a<br>R6f<br>R8k<br>R9n</td><td>R2g<br>R4f<br>R6h<br>R8k<br>R9n</td><td>R2h<br>R4h<br>R6h<br>R8k<br>R9n</td><td>R2j<br>R4h<br>R6h<br>R8k<br>R9n</td></tr>
<tr><td colspan="5">214<br>L–M<br>216<br>R9c<br>R7c<br>R5c<br>R3c<br>R1c<br><br>SM</td><td colspan="5">200<br>U′–V′<br>219<br>R18j<br>R17e<br>R15e<br>R13e<br>R11d<br>S2<br>118<br>M′–H<br>115<br>SM</td></tr>
</table>

SORTING D1 SERIES

Now let it be assumed that a sorting operation is to be performed on those cards bearing the code notations for one of the special characters as represented by the subseries D1, Fig. 10, such as that of a question mark (?) which is represented by the combination of holes in the "8," "6," "5" and "1" index positions as well as a perforation in the U deck which has no effect on the sorting operation. In order to effect such a sorting operation it is necessary that the switches S2 and S4 be in a normal position; that the switch S3 be shifted to the code I position; and that the code selector switch CSS be shifted such that the brushes 252 will bridge the contacts of line space with the contacts of the line A–F of the code D series. When the "8," "6," "5" and "1" index point positions are sensed a circuit will be successively completed to the control grids of each of the tubes T8, T6, T5 and T1 rendering each of the tubes conductive whereby the data sensed is temporarily stored in these tubes. This circuit may be traced from line 100, line 104, contacts CLC2 now closed, resistor RR3, contacts CR1 closing at each index point position, brush B5, contact roll, brush B6, switch S2, switch S3, line 106, brush 110 of BPD1, respective segments 8, 6, 5 and 1 of BPD1, corresponding lines 231, 233, 234 and 238 to the respective control grids of T8, T6, T5 and T1 (Fig. 2*b*).

At 300° machine time the pickup coils of the relays R7 and R8, R3 and R4, R1 and R2 and R12 and R13 (Fig. 2c) are energized causing the respective contacts R7*a*, R3*a*, R1*a* and R12*a* to be closed. When the pickup coils are energized the data stored in the gas tubes are transferred thereto.

At 332° machine time the hold circuits for each of the pickup coils are set up to enable the card to be sorted during the second card cycle. During the second card cycle at one time the circuit is established to the sort magnet SM whereby the card is sorted into the appropriate pocket. This circuit may be traced from line 100, brush B3, segment 1 of the sort commutator SC (Fig. 2*d*), brush B4, contacts CR5 now closed, one segment of the sort emitter SE, contacts R2*a* shifted due to R2 being energized, contacts R3*f* shifted due to R3 being energized, contacts R5*h* as shown, contacts R8*e* shifted due to R8 being energized, contacts R9*g* as shown, line 209, contacts N jumpered to contacts O of the selector switch CSS (Fig. 2*f*), line 204, contacts R18*g* as shown, contacts R17*c* as shown, contacts R15*c* as shown, contacts R13*c* shifted due to R13 being energized, contacts R11*c* as shown, line 118, contacts P jumpered to contacts Q of the selector switch CSS, line 115, sort relay SR, resistors RR9 and RR10 and capacitor C1 in parallel, sort magnet SM to the line 101 whereby the sort magnet becomes energized and the card is deposited in the designated card pocket.

After the card has been sorted the holding circuit is returned to an unenergized state as previously described.

As in the case of series A1 there is a preliminary sorting operation of the subgroups of series D1 which are outside of the selected subgroup. For example, during the time that those cards having the single digits of D1 in codified form are being sorted into the appropriate pockets, those record cards having the special symbols and the characters A–F of series D1 will be sorted into the eleven card pocket while the two remaining subgroups G–P and Q–Z will be sorted into the twelve card pocket. All other series will be deposited into the reject pocket.

In the table below there is listed a representative group of code notations lying within each of the contact positions of the series D1 on the switch CSS. The table sets forth the coding notations for certain numerical characters, special characters and alphabetical characters of the series D1 in addition to identifying the storage relays energized and the complete sorting circuit in each case.

*Series D1*

CHARACTERS

| 0 | 9 | - | ) | / | a | f | g | p | q | z |
|---|---|---|---|---|---|---|---|---|---|---|
| CODE NOTATIONS | | | | | | | | | | |
| 0<br>5<br>6<br>7 | 0<br>7<br>8<br>9 | 1<br>5<br>6<br>7 | 1<br>5<br>7<br>9 | 1<br>6<br>8<br>9 | 2<br>5<br>6<br>9 | 2<br>7<br>8<br>9 | 3<br>5<br>6<br>7 | 3<br>7<br>8<br>9 | 4<br>5<br>6<br>7 | 4<br>7<br>8<br>9 |
| ENERGIZED STORAGE RELAYS | | | | | | | | | | |
| R1<br>R2<br>R3<br>R4<br>R5<br>R6<br>R10<br>R11 | R5<br>R6<br>R7<br>R8<br>R9<br>R10<br>R11 | R1<br>R2<br>R3<br>R4<br>R5<br>R6<br>R12<br>R13 | R1<br>R2<br>R5<br>R6<br>R9<br>R12<br>R13 | R3<br>R4<br>R7<br>R8<br>R9<br>R12<br>R13 | R1<br>R2<br>R3<br>R4<br>R9<br>R14<br>R15 | R5<br>R6<br>R7<br>R8<br>R9<br>R14<br>R15 | R1<br>R2<br>R3<br>R4<br>R5<br>R6<br>R16<br>R17 | R5<br>R6<br>R7<br>R8<br>R9<br>R16<br>R17 | R1<br>R1<br>R3<br>R4<br>R5<br>R6<br>R18 | R5<br>R6<br>R7<br>R8<br>R9<br>R18 |
| SORT COMMUTATOR | | | | | | | | | | |
| 0 | 9 | 0 | 5 | 8 | 4 | 9 | 0 | 9 | 0 | 9 |
| SORTING CIRCUIT | | | | | | | | | | |
| R1d<br>R3e<br>R5f<br>R8a<br>R9g | R2j<br>R4k<br>R6j<br>R8f<br>R9g | R1d<br>R3e<br>R5f<br>R8a<br>R9g | R2e<br>R4b<br>R6e<br>R8f<br>R9g | R2h<br>R4j<br>R6j<br>R8f<br>R9g | R2d<br>R3m<br>R6b<br>R8f<br>R9g | R2j<br>R4k<br>R6j<br>R8f<br>R9g | R1d<br>R3e<br>R5f<br>R8a<br>R9g | R2j<br>R4k<br>R6j<br>R8f<br>R9g | R1d<br>R3e<br>R5f<br>R8a<br>R9g | R2j<br>R4k<br>R6j<br>R8f<br>R9g |
| 209<br>H'-L'<br>201<br>R18h<br>R17d<br>R15d<br>R13c<br>R11c<br>118<br>M'-Q<br>115<br>SM | | 209<br>N-O<br>204<br>R18g<br>R17c<br>R15c<br>R13c<br>R11c<br>118<br>P-Q<br>115<br>SM | | | 209<br>N-N'<br>207<br>R18f<br>R17b<br>R15a<br>R13c<br>R11c<br>118<br>P-Q'<br>211<br>R9e<br>R7e<br>R5e<br>R3d<br>R1c<br>SM | | 209<br>P'-Q'<br>208<br>R18e<br>R17a<br>R15a<br>R13c<br>R11c<br>118<br>R'-S'<br>115<br>SM | | 209<br>P'-T'<br>212<br>R18d<br>R17a<br>R15b<br>R13c<br>R11c<br>118<br>R'-U<br>115<br>SM | |

The numerical characters and the coding notations therefor for the series F1 and G1 are below in tabular form. In addition the table shows the storage relays energized each time a particular numerical character in coded form is sensed as well as the tracing of the electrical circuit through the decoding relays and the code selector switch to the sort magnet necessary to cause a card to be deposited into a particular card pocket.

For a sorting operation to be performed on the code notations of the series F1, the switch S1 is shifted to engage contacts N, the switches S2 and S4 are moved so as to engage the contacts code I and N while the switch CSS is positioned such that the brushes 262 bridge the contacts of line code F with the contacts of line code G. In sorting the code notations of series F2, the switches S1 and S3 remain in the same position as for series F1 while the switches S2 and S4 are shifted so as to engage the contacts code II and N.

In order to sort the code notations of series G1, the switch S2 is shifted to the U contacts position, the switches S2 and S4 are positioned so as to engage the contacts code S and N, and the switch CSS is moved such that the brushes 252 bridge the contacts of line code G with the contacts of the next higher line. Inasmuch as the series G1 relate to two digit numerical characters thus necessitating a second sorting operation, the switches S2 and S4 are shifted to the tens digit position while the switches S3 and CSS remain in the same position as for the units digit sorting operation.

*Series F1*

| CHARACTER | | | | | | | | | |
|---|---|---|---|---|---|---|---|---|---|
| 0 | 1 | 2 | 3 | 4 | 5 | 6 | 7 | 8 | 9 |
| CODE NOTATION | | | | | | | | | |
| 5<br>6<br>7 | 5<br>6<br>8 | 5<br>7<br>8 | 6<br>7<br>8 | 5<br>6<br>9 | 5<br>7<br>9 | 6<br>7<br>9 | 5<br>8<br>9 | 6<br>8<br>9 | 7<br>8<br>9 |
| ENERGIZED STORAGE RELAYS | | | | | | | | | |
| R1<br>R2<br>R3<br>R4<br>R5<br>R6 | R1<br>R2<br>R3<br>R4<br>R7<br>R8 | R1<br>R2<br>R5<br>R6<br>R7<br>R8 | R3<br>R4<br>R5<br>R6<br>R7<br>R8 | R1<br>R2<br>R3<br>R4<br>R9 | R1<br>R2<br>R5<br>R6<br>R9 | R3<br>R4<br>R5<br>R6<br>R9 | R1<br>R2<br>R7<br>R8<br>R9 | R3<br>R4<br>R7<br>R8<br>R9 | R5<br>R6<br>R7<br>R8<br>R9 |
| SORT COMMUTATOR | | | | | | | | | |
| 0 | 1 | 2 | 3 | 4 | 5 | 6 | 7 | 8 | 9 |
| SORTING CIRCUIT | | | | | | | | | |
| R1*d*<br>R3*e*<br>R5*f*<br>R8*g*<br>R9*g*<br>209<br>Y-Z<br>219<br>R18*j*<br>R17*e*<br>R15*e*<br>R13*e*<br>R11*d*<br>S4<br>118<br>T-Y′<br>115<br>SM | R2*a*<br>R3*f*<br>R5*h*<br>R8*e*<br>R9*g*<br>209<br>Y-Z<br>219<br>R18*j*<br>R17*e*<br>R15*e*<br>R13*e*<br>R11*d*<br>S4<br>118<br>T-Y′<br>115<br>SM | R2*b*<br>R3*h*<br>R5*h*<br>R8*e*<br>R9*g*<br>209<br>Y-Z<br>219<br>R18*j*<br>R17*e*<br>R15*e*<br>R13*e*<br>R11*d*<br>S4<br>118<br>T-Y′<br>115<br>SM | R2*c*<br>R3*n*<br>R5*n*<br>R8*e*<br>R9*g*<br>209<br>Y-Z<br>219<br>R18*j*<br>R17*e*<br>R15*e*<br>R13*e*<br>R11*d*<br>S4<br>118<br>T-Y′<br>115<br>SM | R2*d*<br>R3*m*<br>R6*b*<br>R8*f*<br>R9*g*<br>209<br>Y-Z<br>219<br>R18*j*<br>R17*e*<br>R15*e*<br>R13*e*<br>R11*d*<br>S4<br>118<br>T-Y′<br>115<br>SM | R2*e*<br>R4*b*<br>R6*e*<br>R8*f*<br>R9*g*<br>209<br>Y-Z<br>219<br>R18*j*<br>R17*e*<br>R15*e*<br>R13*e*<br>R11*d*<br>S4<br>118<br>T-Y′<br>115<br>SM | R2*f*<br>R4*e*<br>R6*e*<br>R8*f*<br>R9*g*<br>209<br>Y-Z<br>219<br>R18*j*<br>R17*e*<br>R15*e*<br>R13*e*<br>R11*d*<br>S4<br>118<br>T-Y′<br>115<br>SM | R2*g*<br>R4*f*<br>R6*j*<br>R8*f*<br>R9*g*<br>209<br>Y-Z<br>219<br>R18*j*<br>R17*e*<br>R15*e*<br>R13*e*<br>R11*d*<br>S4<br>118<br>T-Y′<br>115<br>SM | R2*h*<br>R4*j*<br>R6*j*<br>R8*f*<br>R9*g*<br>209<br>Y-Z<br>219<br>R18*j*<br>R17*e*<br>R15*e*<br>R13*e*<br>R11*d*<br>S4<br>118<br>T-Y′<br>115<br>SM | R2*j*<br>R4*k*<br>R6*j*<br>R8*f*<br>R9*g*<br>209<br>Y-Z<br>219<br>R18*j*<br>R17*e*<br>R15*e*<br>R13*e*<br>R11*d*<br>S4<br>118<br>T-Y′<br>115<br>SM |

*Series G1*

| Units Sort | | | | | | | Tens Sort | | | | | | |
|---|---|---|---|---|---|---|---|---|---|---|---|---|---|
| CHARACTER | | | | | | | | | | | | | |
| 00 | 09 | 10 | 20 | 30 | 40 | 49 | 00 | 09 | 10 | 20 | 30 | 40 | 49 |
| CODE NOTATIONS | | | | | | | | | | | | | |
| 0<br>1<br>5 | 3<br>4<br>5 | 0<br>1<br>6 | 0<br>1<br>7 | 0<br>1<br>8 | 0<br>1<br>9 | 3<br>4<br>9 | 0<br>1<br>5 | 3<br>4<br>5 | 0<br>1<br>6 | 0<br>1<br>7 | 0<br>1<br>8 | 0<br>1<br>9 | 3<br>4<br>9 |
| ENERGIZED STORAGE RELAYS | | | | | | | | | | | | | |
| R1<br>R2<br>R3<br>R4<br>R10<br>R11 | R7<br>R8<br>R9<br>R10<br>R11 | R1<br>R2<br>R3<br>R4<br>R12<br>R13 | R1<br>R2<br>R3<br>R4<br>R14<br>R15 | R1<br>R2<br>R3<br>R4<br>R16<br>R17 | R1<br>R2<br>R3<br>R4<br>R18 | R7<br>R8<br>R9<br>R18 | R1<br>R2<br>R10<br>R11<br>R12<br>R13 | R1<br>R2<br>R10<br>R17<br>R19 | R3<br>R4<br>R10<br>R11<br>R12<br>R13 | R5<br>R6<br>R10<br>R11<br>R12<br>R13 | R7<br>R8<br>R10<br>R11<br>R12<br>R13 | R9<br>R10<br>R11<br>R12<br>R13 | R9<br>R16<br>R17<br>R18 |
| SORT COMMUTATOR | | | | | | | | | | | | | |
| 0 | 9 | 0 | 0 | 0 | 0 | 9 | 0 | 0 | 1 | 2 | 3 | 4 | 4 |
| SORTING CIRCUIT | | | | | | | | | | | | | |
| R1*d*<br>R3*e*<br>R5*f*<br>R8*b*<br>R9*h*<br>221<br>W′-X′<br>225<br>R11*b*<br>R13*b*<br>R15*a*<br>R16*d*<br>R18*c*<br>121<br>S4<br>118<br>B2-Y′<br>115<br>SM | R2*j*<br>R4*k*<br>R6*k*<br>R8*n*<br>R9*h* | R1*d*<br>R3*e*<br>R5*f*<br>R8*b*<br>R9*h*<br>221<br>W′-X′<br>225<br>R11*a*<br>R13*b*<br>R15*a*<br>R16*d*<br>R18*c*<br>121<br>S4<br>118<br>B2-Y′<br>115<br>SM | R1*d*<br>R3*e*<br>R5*f*<br>R8*b*<br>R9*h*<br>221<br>W′-X′<br>225<br>R11*a*<br>R13*a*<br>R15*a*<br>R16*d*<br>R18*c*<br>121<br>S4<br>118<br>B2-Y′<br>115<br>SM | R1*d*<br>R3*e*<br>R5*f*<br>R8*b*<br>R9*h*<br>221<br>W′-X′<br>225<br>R11*a*<br>R13*a*<br>R14*d*<br>R16*d*<br>R18*c*<br>121<br>S4<br>118<br>B2-Y′<br>115<br>SM | R1*d*<br>R3*e*<br>R5*f*<br>R8*b*<br>R9*h*<br>221<br>W′-X′<br>225<br>R11*a*<br>R13*a*<br>R14*d*<br>R16*c*<br>R18*c*<br>121<br>S4<br>118<br>B2-Y′<br>115<br>SM | R1*j*<br>R4*h*<br>R6*h*<br>R8*n*<br>R9*h*<br>221<br>W′-X′<br>225<br>R11*a*<br>R13*a*<br>R14*d*<br>R16*c*<br>R18*c*<br>121<br>S4<br>118<br>B2-Y′<br>115<br>SM | R1*d*<br>R3*e*<br>R5*g*<br>R8*c*<br>R9*j*<br>226<br>D″-C″<br>220<br>R18*k*<br>R17*g*<br>R15*g*<br>R13*f*<br>R11*d*<br>S4<br>118<br>B2-Y′<br>115<br>SM<br>O | R1*d*<br>R3*e*<br>R5*g*<br>R8*c*<br>R9*j*<br>226<br>D″-C″<br>220<br>R18*k*<br>R17*e*<br>R15*e*<br>R13*e*<br>R11*d*<br>S4<br>118<br>B -Y′<br>115<br>SM<br>O | R2*a*<br>R3*g*<br>R5*g*<br>R8*c*<br>R9*j*<br>226<br>D″-C″<br>220<br>R18*k*<br>R17*f*<br>R15*f*<br>R13*e*<br>R11*d*<br>S4<br>118<br>B2-Y′<br>115<br>SM<br>O | R2*b*<br>R3*j*<br>R5*g*<br>R8*c*<br>R9*j*<br>226<br>D″-C″<br>220<br>R18*k*<br>R17*g*<br>R15*f*<br>R13*f*<br>R11*d*<br>S4<br>118<br>B2-Y′<br>115<br>SM<br>O | R2*c*<br>R3*n*<br>R6*a*<br>R8*c*<br>R9*j*<br>226<br>D″-C″<br>220<br>R18*k*<br>R17*g*<br>R15*g*<br>R13*f*<br>R11*d*<br>S4<br>118<br>B2-Y′<br>115<br>SM<br>O | R2*d*<br>R4*a*<br>R6*c*<br>R8*h*<br>R9*j*<br>226<br>D″-C″<br>220<br>R18*k*<br>R17*g*<br>R15*g*<br>R13*f*<br>R11*d*<br>S4<br>118<br>B2-Y′<br>115<br>SM<br>O | R2*d*<br>R4*a*<br>R6*c*<br>R8*h*<br>R9*j*<br>226<br>D″-C″<br>220<br>R18*k*<br>R17*e*<br>R15*e*<br>R13*e*<br>R11*d*<br>S4<br>118<br>B2-Y′<br>115<br>SM<br>O |

A study of all of the foregoing tables will show that for all those series having 2 perforations in the lower deck, such as series E, or, in the situation where the transpositions of decks take place causing the same relays to be energized as in the case of 2 perforations in the lower deck, two perforations in the intermediate deck, such as series B1, E and G1, a circuit is completed through the contacts of relays R1–9 from the respective segments of the sort commutator SC to the common output set of contacts R9*h*. The code selector switch couples this common output R9*h* through the various selective settings thereof to a separate circuit through the relays R10–18 for each of the series B1, E and G1 with each of the separate circuits culminating in the common output of the contacts R18*c*.

Likewise from the foregoing tables, it is apparent that for all those series having three perforations in the lower deck, such as series B1, D1 and F1, a separate electrical circuit is completed through the network of contacts of the relays R1–9 from the respective segments of the sort commutator SC to the common output set of contacts R9*g*.

Also that the series A1 having four perforations in the lower deck has a common output in the contacts R9*f* for those record cards having code notations of series A1 which are to be sorted into pockets 0–4, and a common output in the contacts R9*n* for those record cards having code notations of series A1 which are to be deposited into pockets 5–9. It is to be noted that in none of the other coding series is there a requirement for two outputs. In the case of series A1 two outputs are necessary due to the repetition of the code pattern in the lower deck within the subgroups G–P and Q–Z. The series C2 which comprises four holes in the lower deck representing values which are to be deposited in the pockets 5–9 also completes the circuit from the respective segments of the sort commutator through the network of contacts of relays R1–9 to the common output R9*n*.

The series B1, F1 and D1 each having three holes in the lower deck will upon being sensed cause a circuit to be completed from the respective segments of the sort commutator SC through the image of contacts of the relays R1–9 to the common set of contacts R9*g*.

The series G1 having one perforation in the lower deck will during a tens sorting operation cause a circuit to be completed from the sort commutator SC through the network of contacts of the relays R1–9 to the set of contacts R9*j*.

The series A1 also having five holes in the lower deck will upon being sensed establish a circuit through the network of relays R1–9 to the contacts R9*k*.

The code selector switch CSS through the various selective settings thereof will cause the common input contacts R18*k* of relay R18 to be coupled with the appropriate output contacts of relay R9 for all those series having two perforations in the intermediate deck with the circuit being completed through the network of contacts of the relays R10–R18 to a common output set of contacts R11*d*.

The code selector switch CSS selectively will cause the common input set of contacts R13*j* to be coupled with the associated output contacts of relay R9 for all those series having no perforations in the intermediate deck, such as series F1 and C2, with the exception of the character *a* of series A1. This circuit will be completed through the image of contacts of the relays R10 to R18 to a common output set of contacts R11*d*.

For series D1, the code selective switch CSS selectively couples the common output set of contacts R9*g* to five separate input set of contacts R18*h*, R18*g*, R18*f*, R18*e* and R18*d* where the input selected is determined by the perforations appearing in the intermediate deck I of the record card. For example, a record card having the "0" index point position perforated in addition to the additional perforations in the lower deck will upon being sensed cause a circuit to be completed from contacts R9*g* through the switch CSS to the contacts R18*h*. In like manner those record cards of series D1 having perforations in either the "1," "2," "3," and "4" index point positions will cause a circuit to be established through the respective contacts R18*g*, R18*f*, R18*e* and R18*d*.

Five separate electrical paths will be set up from the contacts R18*h*, R18*g*, R18*f*, R18*e* and R18*d* through the network of contacts of relays R10–R18 with all of said electrical paths terminating in the common output set of contacts R11*c*.

For series A1, the code selector switch CSS will selectively couple the respective output contacts of relay R9 which are common to those record cards having four holes in the lower deck to one of the set of contacts R18*h*, R18*g*, R18*f*, R18*e* and R18*d* which is determined by the occurrence of a single perforation in one of the index point positions in the intermediate deck as in the case of code D1.

The tables show further that the series C1 and C2 each have a separate electrical decoding path not common with the decoding networks of the other series. The series C1 and C2 will be decoded only in those cases where a complete circuit is established through the respective network of relay contacts comprising at least four relay contacts shifted from an original position.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a sorting machine for sorting records having columns containing index point positions 9, 8, 7, 6, 5, 4, 3, 2, 1, and 0 and being divided into two decks, in each of which a character may be represented by designations, each in accordance with a different coding system where the combinational arrangement of designation within the two decks of one coding system occupies a position transposed from the combinational arrangement of designations of the other coding system, means for sensing the columns for designations, a set up device including a plurality of storage means equal in number to said index positions and respectively associated therewith, said storage means controlled by said sensing means to represent the designations sensed in both decks, sorting means controlled by said device, and positionable means coupled intermediate said sensing means and said set up device, said positionable means including a switching device having a different position for each of said one and said other coding system, said switching device in one of said positions intercoupling said sensing means upon the sensing of one of said index positions to the corresponding one of said storage means, and in the other of said positions to said corresponding one of said storage means relative to the 5's complementary value.

2. In a sorting machine for sorting records having columns containing index point positions 9, 8, 7, 6, 5, 4, 3, 2, 1 and 0 and being divided into two decks, each of said columns adapted to receive by designations therein a two digit number where one order of said numbers is designated within one of said decks and the other order of said number is designated within the other of said decks, means for sensing the columns for designations, a set up device including a plurality of storage means equal in number to said index positions and respectively associated therewith, said storage means controlled by said sensing means to represent the designations sensed in both decks, order switch means having a pair of contact positions, means coupled intermediate said sensing means and said storage means and including said switch means in one of said positions for applying said sensed designations to the corresponding one of said storage means, and transposition means coupled intermediate said sensing means and said storage means and including said switch in the other of said positions for applying said sensed designations to the corresponding one of said storage means according to the 5's complementary value.

HANS P. LUHN.

REFERENCES CITED

The following references are of record in the file of this patent:

UNITED STATES PATENTS

| Number | Name | Date |
|---|---|---|
| 1,741,985 | Ford | Dec. 31, 1929 |
| 2,531,874 | Dean | Nov. 28, 1950 |